US008782599B2

(12) United States Patent
Eldridge et al.

(10) Patent No.: US 8,782,599 B2
(45) Date of Patent: Jul. 15, 2014

(54) MULTI-MODE EDITOR FOR CONFIGURING PROCESS CONTROL BLOCKS INCLUDING BOTH LOGICAL FUNCTIONS AND ARITHMETIC COMPUTATIONS

(75) Inventors: Keith E. Eldridge, North Easton, MA (US); Mikhail Vladimirovich Fishbeyn, Natick, MA (US); John P. King, Greenville, RI (US); Paul Meskonis, Norwood, MA (US); James William Hemenway, West Wareham, MA (US)

(73) Assignee: Invensys Systems, Inc., Foxboro, MA (US)

( * ) Notice: Subject to any disclaimer, the term of this patent is extended or adjusted under 35 U.S.C. 154(b) by 1312 days.

(21) Appl. No.: 12/147,470

(22) Filed: Jun. 26, 2008

(65) Prior Publication Data

US 2009/0327942 A1 Dec. 31, 2009

(51) Int. Cl.
*G06F 9/44* (2006.01)
(52) U.S. Cl.
USPC .......................................... 717/110; 717/104
(58) Field of Classification Search
None
See application file for complete search history.

(56) References Cited

U.S. PATENT DOCUMENTS

| | | | |
|---|---|---|---|
| 5,760,788 A * | 6/1998 | Chainini et al. | 345/474 |
| 6,282,699 B1 * | 8/2001 | Zhang et al. | 717/109 |
| 7,000,191 B2 * | 2/2006 | Schmitt et al. | 715/764 |
| 7,231,635 B2 * | 6/2007 | Schwabe | 717/126 |
| 7,316,003 B1 * | 1/2008 | Dulepet et al. | 717/111 |
| 7,370,315 B1 * | 5/2008 | Lovell et al. | 717/100 |
| 7,823,122 B1 * | 10/2010 | Englehart | 717/106 |
| 7,849,440 B1 * | 12/2010 | Englehart | 717/106 |
| 7,954,059 B2 * | 5/2011 | Macklem et al. | 715/763 |
| 7,975,233 B2 * | 7/2011 | Macklem et al. | 715/763 |
| 8,015,544 B1 * | 9/2011 | Englehart | 717/106 |
| 2005/0229154 A1 * | 10/2005 | Hiew et al. | 717/110 |
| 2006/0143570 A1 * | 6/2006 | Washington et al. | 715/763 |
| 2008/0168431 A1 * | 7/2008 | Ito et al. | 717/154 |

* cited by examiner

*Primary Examiner* — Lewis A Bullock, Jr.
*Assistant Examiner* — Christine Dang
(74) *Attorney, Agent, or Firm* — Edward S. Jarmolowicz, Esq.

(57) ABSTRACT

A multi-editing mode LOGIC BLOCK object editor is disclosed for creating and modifying LOGIC BLOCK objects that are incorporated into control strategies for process control systems (both distributed and discrete). The editor includes an RPN text editing mode wherein logic incorporated into a LOGIC BLOCK is represented by a list of text instructions. The editor also includes a graphical function block diagram editing mode wherein LOGIC BLOCK logic is defined via instruction shapes dragged/dropped from a pallet and connected via GUI line connection actions by a user. The editor supports automated transitioning between the text and graphics modes wherein conversion of text-to-graphics and graphics-to-text is performed without user intervention. Furthermore, synchronization procedures are performed when LOGIC BLOCK objects are opened in the editor and when transitioning between editing modes to track and/or maintain synchronous status between graphical and text representations of LOGIC BLOCK logic.

12 Claims, 18 Drawing Sheets

FIG. 2c

| | |
|---|---|
| CalcTab | 270 |
| CalcGraphicEditor | 272 |
| CalcTreeView | 273 |
| ALDWatchDlg | 274 |
| InputInstructionConfigDlg | 275 |
| InstructionConfigDlg1 | 276 |
| InstructionConfigDlg2 | 277 |
| InstructionConfigDlg3 | 278 |
| NOPConfigDlg | 279 |
| PolyadicConfigDlg | 280 |
| PRGENDConfigDlg | 281 |
| CalcKeyWords | 282 |
| CalcComp | 283 |
| BlockComp | 284 |
| BlockComps | 285 |
| ConnectionSettings | 286 |
| ConnectionSupport | 287 |
| ConnectionValidation | 288 |
| InstructionResizer | 289 |
| RPNValidation | 290 |
| RegExpEditor | 291 |
| ALDParamField | 292 |
| ALDCalcErrorField | 293 |
| ALDCalcMAField | 294 |
| ALDVisioCalcField | 295 |
| ALDParameters | 296 |
| ALDRandomProvider | 297 |
| MxSimAttribute | 298 |

| | |
|---|---|
| SupportOutputs() | 300 |
| GetMaxNumberOperands() | 302 |
| CalcMyInstruction() | 304 |
| Import() | 306 |
| SupportsFanOut() | 308 |
| HasFanOut() | 310 |
| Connect() | 312 |
| StartALD() | 314 |
| CalcBoundingRectangle() | 316 |
| SetLocation() | 318 |
| MyInstructionSet() | 320 |
| MyOperands() | 322 |
| InvOperand() | 324 |
| FindRelatedShapes() | 326 |
| HasBranchDependency() | 328 |
| ComponentType() | 330 |
| IsBranch() | 332 |
| GetDialogForType() | 334 |
| CreateNew() | 336 |
| GetOtherShape() | 340 |
| Validate() | 342 |

FIG. 3

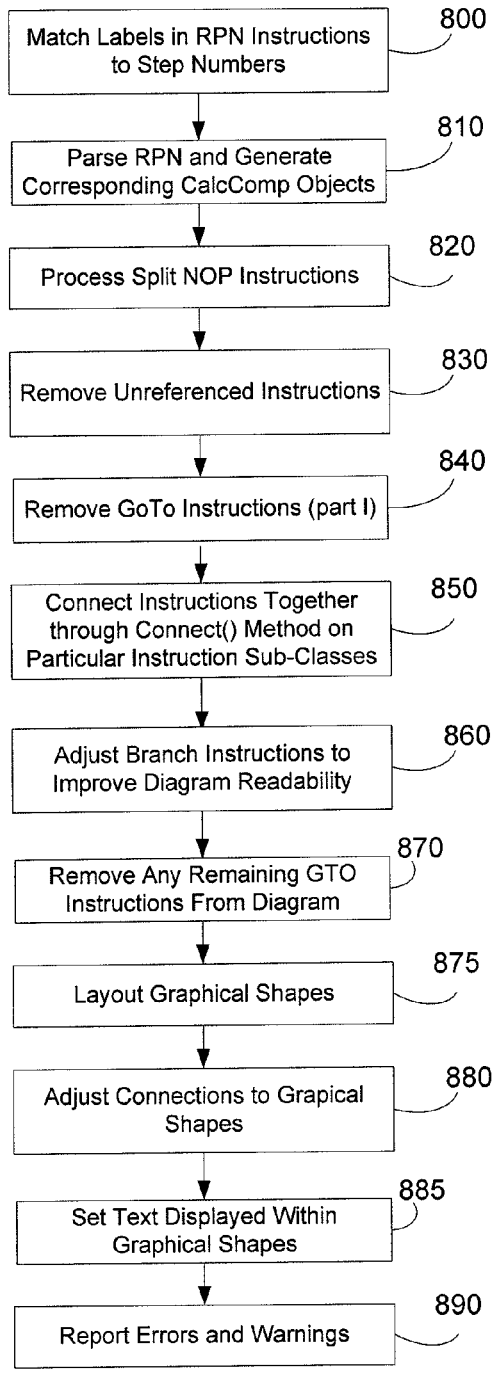
FIG. 8
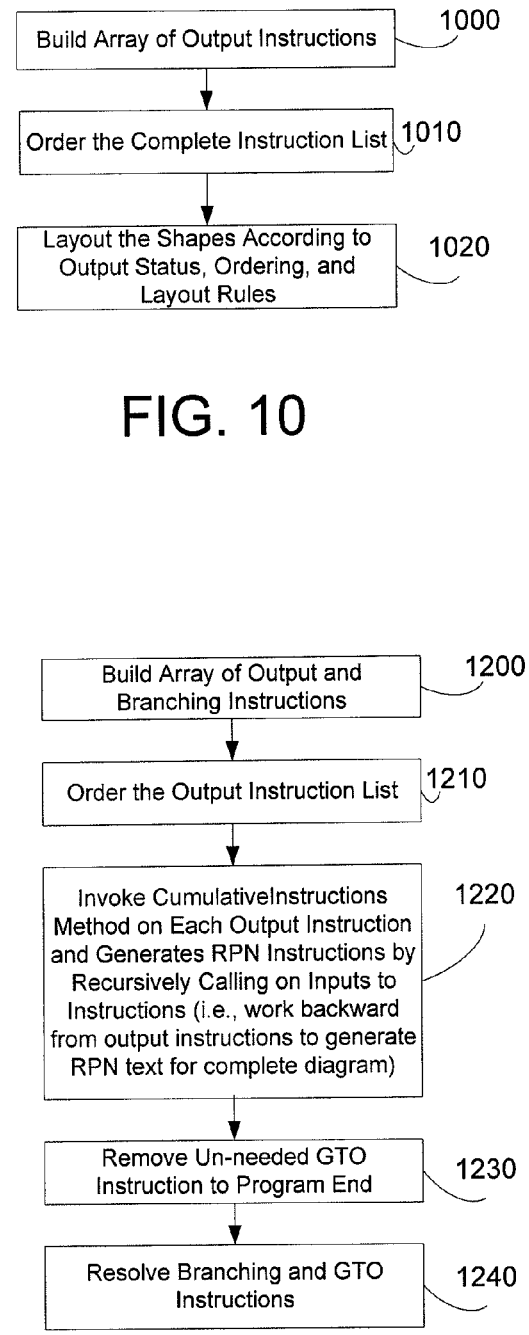
FIG. 10
FIG. 12

```
   01  BIT  4
   02  SIN
*  03  GTO  5
   04  COS
   05  IN   1
   06  ADD  2
```

| Instruction | Cumulative Instructions (without guide and labels info) |
|---|---|
| BIT | 1,BIT\3 |
| SIN | 1,BIT\3 |
|  | 2,SIN |
| COS | 3,COS |
| IN 1 | 4,IN\t1 |
| ADD 2 | 1,BIT\3 |
|  | 2,SIN |
|  | 6,GTO\t4 |
|  | 3,COS |
|  | 4,IN\t1 |
|  | 5,ADD\t2 |
|  | 5,GTO\tPRGEND |

MULTI-MODE EDITOR FOR CONFIGURING PROCESS CONTROL BLOCKS INCLUDING BOTH LOGICAL FUNCTIONS AND ARITHMETIC COMPUTATIONS

FIELD OF THE INVENTION

The present invention generally relates to the field of programmable/configurable computerized control systems. More particularly, the invention concerns application programs including graphical interfaces for creating/configuring control programs for continuous and/or discrete processes.

BACKGROUND

Industry increasingly depends upon highly automated data acquisition and control systems to ensure that industrial processes/operations run efficiently, safely and reliably while lowering overall costs. In such systems, data acquisition begins with sensors measuring current values/status of process variables representing the status/operation of an industrial process or operation. The measurements are communicated to programmed controllers and data collection/management systems. The data collection/management systems, generally including process databases and data processing routines, manage and maintain the measurement data. Such data management and maintenance includes further processing the data (e.g., filtering), storing the data, and distributing the data to a variety of client applications. Such client applications include both automated and manual supervisory control processes and display/monitor user interfaces.

Industrial process/operation measurements come in a wide variety of forms and are used by industrial process control systems to regulate a variety of operations, both with respect to continuous and discrete manufacturing processes. By way of example the measurements produced by a sensor/recorder include: a temperature, a pressure, a pH, a mass/volume flow of material, a quantity of bottles filled per hour, a tallied inventory of packages waiting in a shipping line, or a photograph of a room in a factory. Often, sophisticated automated process management and control hardware/software examine acquired process/operation measurement data, and respond by sending messages/signals to actuators/controllers that adjust the operation of at least a portion of the industrial process. The control software comprises, for example, one or more control strategies that, in turn, include a set of control blocks. The control programs potentially operate at a variety of levels of control including, for example, regulatory control (e.g., maintaining a particular specified set point for a process variable) and supervisory control (e.g., specifying a set point for a controlled process variable).

Automated control systems for typical industrial processes are often complex. Developing customized control programs for such automated control systems is, of course, a complex and time-consuming task. However, today control system programming is streamlined and simplified by graphical user interface-based control program development environments/toolkits that allow creation of control programs by dragging and dropping, and thereafter connecting, graphical representations of pre-programmed components/elements of a control program. Such graphical representations are associated with control software objects (or more specifically control software object templates) that, when instantiated and deployed on a control software object execution platform, carry out particular defined operations/functions in an overall control environment.

Programming automated control of processes using graphical editors and sets of selectable, pre-programmed, object templates is a substantial improvement over programming control using written instructions. The graphical user interface-based control program environment has substantially eliminated the need for control engineers to develop control programs using low-level instruction code, or even higher level compiled source code languages. Instead, developers of control programs invoke graphical control program editors having associated pre-programmed control objects represented by symbols provided in a control template pallet. Thus, instead of learning to program control using written instructions/code, programmers need only become knowledgeable with regard to various tasks/functions carried out by control objects instantiated from selectable control object templates.

Known graphical control program editors support an extensible set of control object templates. The new control object templates include new control elements with new attributes/functionality not found in existing control object template sets/pallets. In some instances the new control object templates are derived from existing templates. In other instances, the new control object templates comprise a set of connected, pre-existing, control object templates.

A particular class of control block, that is the subject of an editor described herein below, is capable of including both logical functions and arithmetic computations (including time measurements) in a single block. Such control block is referred to herein as a "LOGIC BLOCK" (all capitals to distinguish from the more particular LOGIC block described below). Examples of such LOGIC BLOCKs include: CALC, CALCA, MATH and LOGIC blocks in a known control block scheme provided by INVENSYS SYSTEMS, INC.

The CALC (calculator) block combines logical functions and arithmetic and Boolean computational capabilities within a single integrated programming environment component. The CALC block supports specialized control needs that cannot be met efficiently with either a standard block set offering or a sequence control block. The CALC block operates like most programmable pocket calculators. The CALC block's input/output modularity and programming capacity provides a level of functionality that complements the standard block set offering. Every program step within a CALC block contains an opcode, which identifies the operation to be performed, and one command line argument. The command line argument consists of the actual operand for the step, the location of the operand, a specification of details which further refine the opcode, or some combination of these factors.

The CALCA (Advanced Calculator) block provides both logical functions and arithmetic computational capability within one integrated programming environment component. The CALCA block provides dual-operand efficiency in several mathematical and logical instructions, resulting in as much as a three-to-one reduction in the length of a control program relative to the same calculations performed in a CALC block program. The CALCA block does not support clamping real outputs, whereas the CALC block does support clamping. With this exception, programs written for the CALC, MATH, or LOGIC blocks will execute in the CALCA block without change. The CALCA block supports entering up to 50 programming steps to a single block during configuration. Each program step is represented by a parameter string of up to 16 characters.

The LOGIC block provides both logical functions and timer capability within one integrated programming environment component. The LOGIC block supports specialized control needs that cannot be met efficiently with either a standard block set offering or sequence control blocks. The LOGIC block is modeled after the CALC block and can be used instead of CALC blocks in most control block data base configurations where logic or timer functions are required, but mathematical functions are not required since mathematical functions are not supported by LOGIC blocks.

The MATH (Mathematics) block provides mathematical programming capability and dual operand efficiency in several mathematical instructions. Dual operands can reduce the length of a CALC program which uses only single operands. The configuration process supports programming the MATH block by entering a series of up to 20 programming steps. Each program step is represented by a parameter string of up to 16 characters. The MATH block is used when mathematical functions are required but engineering ranges and logic/timer functions are not.

Thus, LOGIC BLOCKS operate much like a programmable pocket calculator, and have historically been programmed by using textual commands specified in Reverse Polish Notation (RPN). Although very powerful, correct use of RPN to define control programs requires training for those engineers who are not familiar with its non-intuitive syntax and rules.

SUMMARY OF THE INVENTION

In accordance with the present invention, a control program development editor facility provides a graphical alternative to using RPN to specify logic (including both logical and/or mathematical computational sequences) associated with a control program. Complex algorithms are developed using a function block diagram-like graphical canvas, in which sequences of operations are specified by dragging logic block instructions together and interconnecting them. The graphical editor is complimented by an RPN text editor, and an automatically implemented conversion process that converts between graphics and text representations. Instruction sequences specified in either RPN or the graphical LOGIC BLOCK editor are convertible by the editor into the alternative form and displayed on the editor's display interface.

A multi-editing mode LOGIC BLOCK object editor is thus described for creating and modifying LOGIC BLOCK objects that are incorporated into control strategies for process control systems. The editor includes an RPN text editing mode wherein logic incorporated into a LOGIC BLOCK is represented by a list of text instructions. The editor also includes a graphical function block diagram editing mode wherein LOGIC BLOCK logic is defined via instruction shapes connected via GUI line connection actions by a user. The editor supports automated transitioning between the text and graphics modes wherein conversion of text-to-graphics and graphics-to-text is performed without user intervention. Furthermore, synchronization procedures are performed when LOGIC BLOCK objects are opened in the editor and when transitioning between editing modes to track and/or maintain synchronous status between graphical and text representations of LOGIC BLOCK logic.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2c, identifies a set of components making up the LOGIC BLOCK editor;

FIG. 3 enumerates a set of methods comprising the application program interface of the CalcComp component;

FIG. 8 is a flowchart summarizing a set of steps performed to convert RPN text to a graphical FBD in accordance with an exemplary embodiment of the present invention;

FIG. 10 is a flowchart summarizing a set of steps performed to layout the instruction shapes in accordance with a layout stage of the text to graphical conversion process summarized in FIG. 8;

FIG. 12 is a flowchart summarizing a set of steps performed to convert graphical FBD representations of LOGIC BLOCK logic into RPN text.

DETAILED DESCRIPTION OF THE DRAWINGS

A graphical user interface-based LOGIC BLOCK editor facility for defining LOGIC BLOCKs that are thereafter incorporated into control programs (e.g., control strategies described herein below) for processes is described herein below by reference to figures illustratively depicting an exemplary embodiment of the invention. In accordance with the illustrative embodiment, the LOGIC BLOCK editor facility provides graphical user interface-driven functionality as well as a textual RPN editor/instruction sequence display that enables a programmer to view a LOGIC BLOCK's structure/content both graphically and textually in a control programming environment.

The illustrative examples provided herein are directed primarily to regulatory control programs. The regulatory control programs comprise, by way of example, control objects embodying the above-described LOGIC BLOCKS. The term "control objects" generally refers to software objects that are instantiated and executed to perform a control function. Examples of control objects include control block objects and control strategy objects (comprising multiple, connected control objects—including even child strategy objects). Such control block objects are typically executed on a cyclical basis by control processors (or other suitable processing hardware/platforms) to maintain process variables (representative of the status of a process) within specified operating ranges. However, many aspects of the exemplary editor facility are applicable to higher level (e.g., supervisory) control programs that determine/specify set points for controlled process variables. In yet other embodiments, the graphical editor functionality disclosed herein is incorporated into a discrete control program editor.

In an exemplary embodiment, the control objects of a defined control program (e.g., a control strategy) are assigned to particular execution groups (referred to as compounds) which define a particular control processor upon which the control objects are executed in a runtime control environment. After deployment, and during runtime, process variable values corresponding to displayed attributes of the graphically edited control program are provided to the graphical editor of the control objects to facilitate displaying and setting values associated with live process control data sources. The live data values are displayed proximate to corresponding attributes on rendered appearance objects associated with the deployed control objects. In a particular embodiment the current values for the attributes are displayed adjacent a display element for the particular attributes. Thus, the LOGIC BLOCKs are used to provide a graphical representation of control object attribute values in a runtime environment to monitor the current values of particular watched control program I/O attributes.

Figure 1:
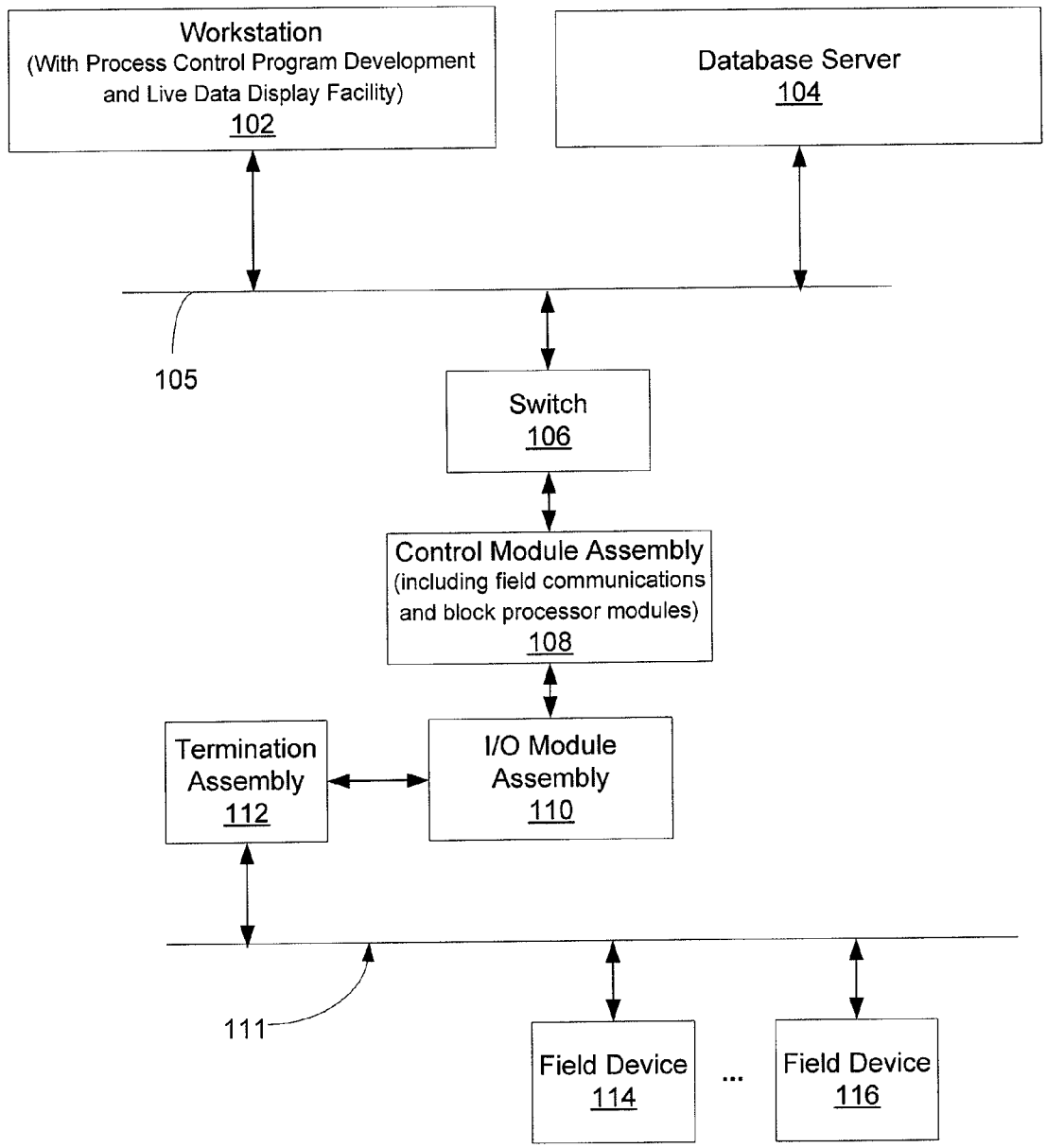
FIG. 1 is schematic network diagram showing an exemplary control strategy development and execution environment comprising both a control network and an application/supervisory network suitable for carrying out an embodiment of the present invention.

Before, describing a LOGIC BLOCK editor facility embodying the present invention, an exemplary process control network environment/facility is briefly described. The present invention is potentially incorporated in a variety of process control facility arrangements, and other physical process control arrangements will be known to those skilled in the art in view of the disclosure contained herein. Turning to FIG. 1, an exemplary simple process control system arrangement/environment is depicted wherein an exemplary LOGIC BLOCK editor facility operates to create executable process control programs at a regulatory process control level. A workstation 102 (e.g., a FOXBORO Application Workstation model AW70P, by Invensys Systems, Inc.), comprising graphical LOGIC BLOCK editors, provides a graphical control program design/development environment for defining new control programs and modifying existing programs. The control programs are thereafter deployed to, and executed upon, regulatory control processors to carry out any of a variety of process control tasks through the coordinated operation of a set of associated field devices (e.g., process variable sensors, valves, positioners, etc.) in a control environment.

The workstation 102 comprises any of a variety of hardware/operating system platforms. For example, the workstation 102 comprises, in various preferred and alternative embodiments of the invention, a personal computer potentially running any of a variety of operating systems such as: Microsoft Windows XP, Unix, Linux, Solaris, Mac OS-X, etc.

The workstation 102, by way of example, executes a live data display application. The live data display application extracts runtime data values associated with deployed control programs from a runtime data source (e.g., a runtime database maintained by a control module assembly 108). The extracted data values are rendered upon a graphical display created from previously defined appearance objects and their associated process variable attributes. Exemplary embodiments of the control program editor and live data display applications are described in detail herein below. The database server 104 maintains process control program elements (e.g., object templates and instances) associated with control program development tools and defined process control programs (also referred to herein as strategies). The database server 104 thus operates as a centralized repository of development information utilized by a plurality of workstations (not shown), such as workstation 102, having communicative access to the database server 104.

In the illustrative example, the workstation 102 is connected via an Ethernet interface/wiring to an Ethernet switch 106 via a network link 105. Alternatively, a redundant mesh network provides a communicative path between workstations, database servers, and the switch 106. The Ethernet switch 106 can be any of a variety of commercially available switches. By way of example the Ethernet switch 106 is one provided, for example, by Allied Telesyn (e.g., model AT-8088/MT). While not specifically depicted in FIG. 1, additional nodes, comprising workstations, servers and other elements (e.g., high level control module assemblies) of a supervisory portion of the control system are potentially connected to the switch 106. Furthermore, additional switches are connected to form a switched network.

The switch 106, and potentially other non-depicted switches, is also communicatively coupled to a control module assembly 108. The control module assembly 108 comprises one or more control modules (also referred to as control processors) that execute control programs driven by process sensor data values and render output values to devices (e.g., valves, motors, etc.) controlling a plant process. An illustrative example of such a control module is a FOXBORO CP model FCP270, by Invensys Systems, Inc. In other embodiments, process control functionality is carried out in any of a variety of control modules—even by control programs incorporated into the workstations, intelligent transmitters, or virtually any communicatively coupled device capable of executing control programs, loops, scripts, etc.

In an embodiment where the control module assembly 108 is the FOXBORO FCP270, workload is divided, within the FCP270, between controlling data communications and executing control programs (blocks). The FCP270 processes data received from an I/O module assembly 110 in parallel using the two distinct hardware modules—a block processor module and a field communications module. The block processor module repeatedly executes control programs, created by the process control program development facility residing on the workstation 102, according to a relatively long block processing cycle period (e.g., 100 ms). The output values of the control programs executed within the block processor module are driven by process data received by the control module assembly 108 from the I/O module assembly 110. The I/O module assembly 110 comprises, by way of example, INVENSYS FBM207 and/or FBM217 fieldbus modules that pass digital input values to the control module assembly 108. Both the process data and the output values calculated by the control programs on the control module assembly 108 are accessed, either directly or indirectly, by the live data display facility executing on the workstation 102. In an exemplary embodiment, the process data provided by the control module assembly 108 is displayed alongside corresponding attribute identifications provided by appearance objects associated with a presently displayed graphical representation of a control program—or portion thereof.

With regard to the above-mentioned data communications task carried out by the control module assembly 108, in the illustrative example the field communications module within the FCP270 receives data from the I/O module assembly 110. The received data is passed to both the above-mentioned block processor module (within the control module assembly 108) and to process data subscribers (e.g., data access servers, data acquisition services and the live data display application running on the workstation 102, etc.) according to an appropriate network communication protocol (e.g., TCP/IP) via the network link 105. The protocols/mechanisms used to provide data to various subscribers varies in accordance with particular embodiments of the invention.

With continued reference to FIG. 1, the I/O module assembly 110, alternatively referred to as a field bus module (FBM), is communicatively coupled to the control module assembly 108. Communications protocols utilized for carrying out communications between the I/O module assembly 110 and control module assembly 108 are potentially any one of a variety of proprietary/non-proprietary communications protocols. In one embodiment, the digital data communications between the control module assembly 108 and I/O module assembly 110 are carried out via a 2 MBit HDLC communication protocol. While only a single I/O module assembly 110 is depicted in the illustrative example, control systems embodying the present invention often comprise many I/O module assemblies communicating with each control module assembly 108.

I/O module assemblies, in general, incorporate one or more of a variety of specialized interfaces for communicating directly and/or indirectly to a variety of device types, including sensors/actuators embodying particular communications protocols, located at distributed locations in a plant. In the illustrative example, the I/O module assembly 110 comprises a Foundation Fieldbus I/O module (e.g., an Invensys field bus module model FBM228) that supports communications between the control module assembly 108 and field devices coupled to a Foundation Fieldbus network 111. In the illustrative embodiment, a set of representative intelligent field devices 114 and 116, containing multiple application-dependent configurable parameters, are connected to the Foundation Fieldbus network 111. The field devices 114 and 116 operate at the lowest level of a control system to measure (transmitters) and control (positioners, motor switches, etc.) plant activity. A termination assembly 112 communicatively couples the I/O module assembly 110 to the field devices 114 and 116. The termination assembly 112 provides power and power conditioning to the extent needed by the field devices 114 and 116 on the network 111.

Figures 2A, 2B:
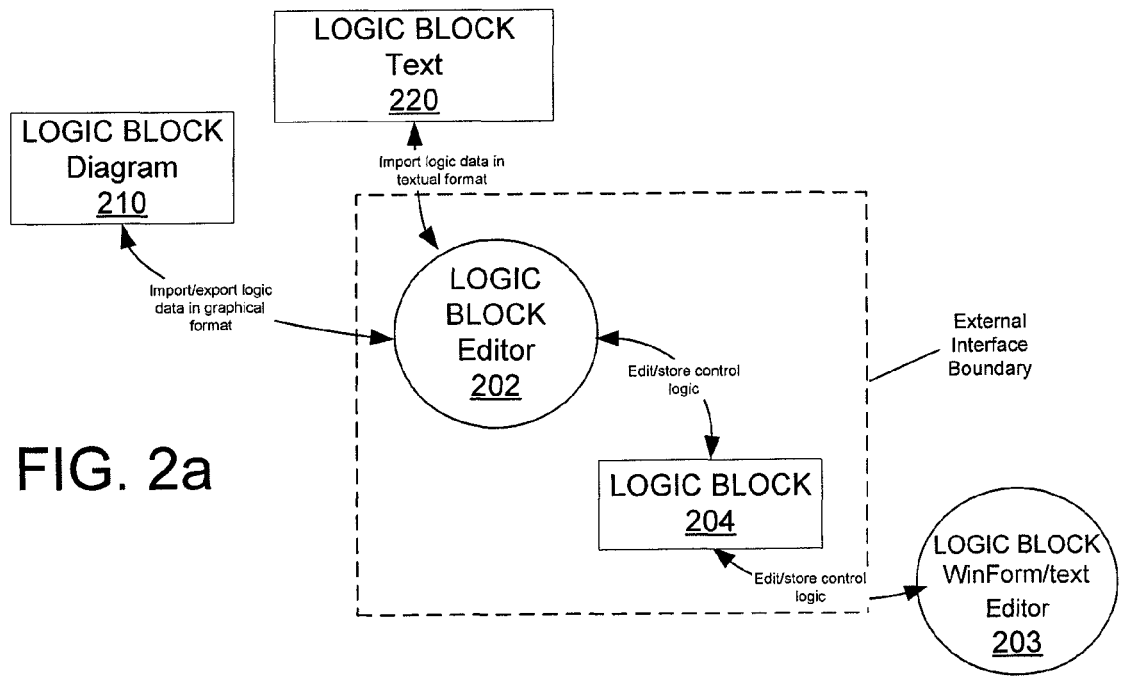
FIG. 2a, is a schematic diagram of depicts an exemplary set of interfaces and components associated with a LOGIC BLOCK editor facility, operating on a computing system.
FIG. 2b, depicts attributes of an exemplary LOGIC BLOCK object.

Having described an exemplary network environment within which a LOGIC BLOCK editor embodying the present invention is potentially incorporated, attention is directed to FIG. 2a, that depicts an exemplary set of interfaces/components associated with a LOGIC BLOCK editor facility, operating on a computing system, that includes a LOGIC BLOCK editor 202 application program for creating new LOGIC BLOCK templates and maintaining LOGIC BLOCK templates and instances that are stored within a control object library. The LOGIC BLOCK templates are used by a strategy editor application to define control programs that are downloadable and executable, by way of example, on control processors. FIG. 2a, depicts a set of software components (represented by circles) and data/objects (represented by rectangles) for the exemplary LOGIC BLOCK editor facility. The LOGIC BLOCK editor facility, including the editor 202, supports creating and modifying LOGIC BLOCK definitions through either textual (see, e.g., FIG. 4) or graphical (see, e.g., FIG. 5) editor interfaces. Synchronization logic and conversion procedures, described herein below, facilitate flexible use of the textual and graphical programming interfaces to edit a most recently saved version of a LOGIC BLOCK object (template or instance). In accordance with an illustrative embodiment, each of the textual and graphical editor interfaces include a control button enabling a user to switch between graphical and textual editor modes on a currently opened LOGIC BLOCK object.

A WinForm/text editor 203 supports defining/modifying LOGIC BLOCK instructions via a text editor user interface (see, FIG. 4 described herein below). The text editor 203 supports entering text comprising instructions and operands that are stored on STEPnn attributes (the executable RPN instruction form) of a LOGIC BLOCK object 204 described further herein below with reference to FIG. 2b. The editor 203 accesses the STEPnn attributes on the LOGIC BLOCK object 204.

The LOGIC BLOCK editor 202 application program, residing/executing for example on workstation 102, supports a variety of program interfaces and related operations performed on the LOGIC BLOCK object 204. Such operations include: modifying a graphical definition of the LOGIC BLOCK 204 using a variety of graphical user interface actions (e.g., select, drag, drop, etc.), displaying a text listing of RPN instructions corresponding to executable STEPnn attributes (at the time the object 204 is opened) in RPN form, importing/exporting control logic definitions in graphical and textual formats, and converting RPN editor text instructions into downloadable/executable machine-executable RPN instructions (stored as STEPnn attributes on the object 204). The editor 202's ability to convert/synchronize between textual and graphical formats (via conversion processes described herein below) for the control logic defined for the LOGIC BLOCK object 204 facilitates switching between graphical and RPN textual representations of the logic specified by the LOGIC BLOCK object 204 in an editing environment.

A textual definition interface of the LOGIC BLOCK editor 202's aforementioned import/export functionality facilitates transferring (importing) LOGIC BLOCK text 220 into the LOGIC BLOCK object 204. The LOGIC BLOCK text 220 is, by way of example, stored as a *.txt file containing LOGIC BLOCK instructions and associated operands that are presented by the editor 202 in RPN format on a multi-panel display space. In the illustrative example wherein the text 220 is imported into the LOGIC BLOCK object 204, the editor 202 reads instructions from the text 220 and updates a set of downloadable/executable STEPnn attributes on the object 204. The text 220 instructions are also stored in a corresponding text data portion of the object 204 that includes a "source" version (potentially containing both labels and annotations—not present in the STEPnn attributes) of the RPN logic instructions maintained in the STEPnn attributes for the object 204.

After the file containing the LOGIC BLOCK text 220 has been processed to render the complete logical listing in the set of STEPnn attributes, the LOGIC BLOCK editor 202 generates, upon demand (when the object 204 is opened for editing via the graphics editor interface) and based upon a set of layout rules, graphics on a canvas for a corresponding LOGIC BLOCK diagram. The graphical representation is synchronized with the previously rendered STEPnn attributes representing the downloadable version of the LOGIC BLOCK logic. The LOGIC BLOCK editor 202's ability to import text files containing logic block instruction data (stored as STEPnn attributes), and automatically create a graphical LOGIC BLOCK diagram definition from the STEPnn attributes, provides a migration capability from existing textual definitions of logic blocks to graphical representations.

The following is an example of a textual (RPN) representation of a LOGIC BLOCK:
SUB RI01 90
BIN 5
IN 90
GTO 10
SUB RI01 10
BIP 10
IN 10
GTO 10
IN RI01
OUT RO01
END The LOGIC BLOCK editor 202 validates the RPN text data to ensure that the actual control logic syntax is correct. Validation performed by the editor 202, by way of example includes:

verifying that each recited instruction is a valid instruction for the identified LOGIC BLOCK type (e.g., MATH). As noted above, the four exemplary LOGIC BLOCK types—e.g., CALC, CALCA, MATH and LOGIC—each support a different instruction set. If an instruction is not within the particular type's instruction set, then the editor 202 ignores/bypasses the instruction during the importation of the LOGIC BLOCK text 220 into the LOGIC BLOCK 204.

verifying that the operands given for any instruction are valid. Invalid memory locations (e.g., "MUL M01 M35"), or invalid input/output attributes (e.g., "IN RI22") are noted, and presented by the editor 202 to the user for correction following the import process.

verifying that branching instructions actually branch to a valid step in the control logic. Invalid branching (e.g., "GTO 35" in a logic block with 20 steps) is noted, and presented to the user for correction following the import process.

A graphical definition interface of the LOGIC BLOCK editor 202's aforementioned import/export functionality facilitates transferring a LOGIC BLOCK diagram 210 into the LOGIC BLOCK object 204. The LOGIC BLOCK diagram 210 is, by way of example, stored as a *.vsd (Microsoft VISIO) file defining a set of connected graphical objects displayed in a multi-panel display of the editor 202. The graphical objects visually depict a corresponding set of RPN instructions for a LOGICAL BLOCK. The LOGIC BLOCK diagram 210 is distributable to other users as desired for editing/modification outside the editor 202's dual editing mode (graphical/textual) environment.

During importation the editor 202, through importation functionality incorporated into the graphical definition interface, stores the LOGIC BLOCK diagram 210 as a graphical component of the LOGIC BLOCK object 204. If the graphical data (e.g., a specified .vsd file) is imported into an existing LOGIC BLOCK object 204, any existing graphical data stored on the object 204 is replaced/overwritten. After storing the graphical definition of the LOGIC BLOCK diagram 210 in the graphical diagram component of the LOGIC BLOCK object 204, the importation logic renders corresponding STEPnn attributes for the LOGIC BLOCK object 204. The STEPnn attributes, in an exemplary embodiment, are displayed as a set of RPN steps within a step confirmation window of the editor 202's user interface (see, FIG. 8, described herein below). In the exemplary embodiment, no labels or comments are stored in the STEPnn attributes version of the instructions stored in the LOGIC BLOCK object 204.

In an exemplary embodiment, validation of the imported graphics file is not needed since the contents of the logic block canvas are already in an appropriate (e.g., .vsd file) format for the editor 202. If an imported graphics file contains a graphic shape that is not recognized by the editor 202, then the graphic is imported as a "dumb" graphic —i.e., one that has no corresponding STEPnn attribute in the downloadable/executable version of the logic represented by the imported graphics file.

In addition, while not shown in FIG. 2a, the LOGIC BLOCK editor 202 supports a live data interface and display mechanism for receiving and displaying current values of LOGIC BLOCK object I/O attributes corresponding to a deployed executable control program defined as RPN STEPnn attributes and displayed via the LOGIC BLOCK editor 202. The editor 202 retrieves current values for parameters identified on a LOGIC BLOCK diagram displayed in a canvas region of the editor 202's graphical interface.

Turning to FIG. 2b, an exemplary set of attributes of the LOGIC BLOCK object 204 are enumerated. The enumerated attributes include fields supporting editing the logic of the LOGIC BLOCK 204 via either a textual (RPN) editor or a graphical editor.

In an exemplary embodiment, a LOGIC BLOCK objects, such as the LOGIC BLOCK object 204, include identification information. By way of example a Block Name attribute 230 stores a string identifying a name for the LOGIC BLOCK object 204. The string is used, for example, to display a name identifying the object to a user when presented in a listing of available objects in a library. A GUID attribute 232 contains an internal identification that uniquely identifies the LOGIC BLOCK within a system.

A next set of attributes is used to specify relative order of execution of LOGIC BLOCKS once they are deployed for execution in a control processor. A Zone attribute 234 stores a value that identifies a block instance's execution zone. A Phase attribute 236 stores a value specifying a particular phase of a control processor's multi-phase execution cycle where an instance of the block is executed. Careful designation of phases ensures that certain input values have been updated (if needed) before use by LOGIC BLOCKs executed in later phases. A Period attribute 238 specifies when output parameters of the LOGIC BLOCK are sampled.

A Block Parameters attribute 240 enumerates block parameters constituting either inputs or outputs of the LOGIC BLOCK object instance.

Additionally, the LOGIC BLOCK object structure includes attributes relating to deployment. A Needs Redeployment flags attribute 242 indicates whether the LOGIC BLOCK object needs to be redeployed to control processors or other execution components of a control system. A Deployment Status attribute 244 indicates whether or not the LOGIC BLOCK object's RPN STEPnn attributes have been successfully deployed to a control processor.

A Strategy attribute 246 stores a string (or other identification value) identifying a parent control strategy that contains the LOGIC BLOCK object instance. An Appearance Object attribute 247 identifies a graphical editor shape or shapes that represent the LOGIC BLOCK object instance on a strategy canvas. Appearance objects are further described in Eldridge et al. U.S. patent application Ser. No. 11/403,225, entitled "Appearance Objects for Configuring and Graphically Displaying Programmed/Configured Process Control," the contents of which are expressly incorporated by reference in their entirety, including any references contained therein.

A Compound attribute 248 identifies a compound to which an instance of the block is assigned when deployed to a specified control processor.

A Controller attribute 249 identifies a control processor to which an instance of the block is/will be deployed.

An RPN text attribute 250 stores text defining the logic in a form used by the RPN text mode of the editor 202. In embodiments, storing text includes storing a reference to another memory structure containing the actual RPN text. Thus, the attribute 250, in accordance with exemplary embodiments, includes the actual RPN text or, alternatively, a reference to a structure (e.g., file) containing the actual RPN text.

A graphics editor diagram attribute 252 stores a definition of the logic of the LOGIC BLOCK suitable for use by a graphical editor mode of the editor 202 (e.g., MICROSOFT VISIO). The graphics editor diagram attribute 252 stores an actual graphics definition or alternatively a reference to another memory structure containing the graphics definition.

A last editor type attribute 254 identifies the mode of the LOGIC BLOCK editor 202 (textual or graphical) when the logic of the LOGIC BLOCK object 204 was last saved. In an exemplary embodiment, the graphics/text state specified by the last editor type attribute 254 determines the mode in which the editor 202 opens a previously saved LOGIC BLOCK object 204—i.e., the editor 202 will initially operate in the mode identified by the last editor type attribute 254.

In accordance with an exemplary embodiment of the editor 202, the editor, under certain circumstances explained herein below, disconnects previously saved RPN text and a current version of a graphical diagram representing the logic of the LOGIC BLOCK object 204. A DisconnectedRPNcode attribute 256 contains a copy of the RPN text that was passed to the graphical editor at the time the diagram became disconnected from the text editor's RPN text. Disconnection arises when the RPN text generated by the graphical editor (upon transition from a text editor mode to a graphical editor mode) differs from the RPN text passed to the graphical editor mode. The RPN text passed to the graphical mode in order to generate the graphical diagram is stored in the RPN text field 250. An IsDisconnectedDiagram attribute 258 indicates whether the current graphical definition stored in attribute 252 is disconnected from the RPN text stored in the RPN text field 250.

An errors attribute 260 enumerates validation errors and warnings detected by the editor 202 in the defined logic of the LOGIC BLOCK object 204 during validation of the RPN instructions.

A steps locked property 262 designates whether RPN STEP attributes on the LOGIC BLOCK object 204 are modifiable.

A logic type property 264 specifies the logic type of the LOGIC BLOCK object 204 (e.g., CALC, CALCA, MATH, and LOGIC).

A maximum steps property 266 specifies a maximum number of RPN steps allowed to define the object 204.

Turning to FIG. 2c, a set of components making up the LOGIC BLOCK editor 202 are identified. A CalcTab component 270 implements the editor 202 interface. The CalcTab component 270 contains computer-executable instructions for implementing an RPN textual editor, a graphical editor, and an output window. The CalcTab component also contains computer-executable instructions enabling a user to print RPN text and graphics contents, validate logic definitions/instruction sequences, switch between graphical and textual editor interface modes, and locking logic with regard to the LOGIC BLOCK object 204.

The following is a summary of the functions supported by the CalcTab component 270. The CalcTab component 270 implements the ability to switch between the Textual and Graphical editors. The CalcTab component 270 also implements printing the contents of either the Textual or Graphical editor, RPN stored in the STEP attributes, Logic block Input parameters and values, and Annotations. The CalcTab component 270 also contains executable instructions for populating an output portion of an editor Window user interface with errors and warnings from RPN validation, and implements navigating to a STEP number or graphical diagram object in response to a user selecting (e.g., double-clicking on) a listed error or warning.

A CalcGraphicEditor component 272 comprises computer executable instructions for implementing the graphical editor mode of the LOGIC BLOCK editor 202. The CalcGraphicEditor component 272 contains computer executable instructions for generating a tree view of logic instructions, an RPN list view, and toolbars. The CalcGraphicEditor component 272 also comprises a graphical block diagram editor (e.g., a VISIO ActiveX control) used to graphically define/represent RPN logic. An exemplary user interface for the graphical editor mode is described herein below with reference to FIG. 8. The CalcGraphicEditor component 272 provides standard graphical editing functionality as well as logic block-specific graphical editing functionality. During initialization, the CalcGraphicEditor component 272 extracts and loads a block diagram definition from the graphics editor diagram attribute 252 of the LOGIC BLOCK object 204. Thereafter, the CalcGraphicEditor component 272 supports a variety of editing, saving and validating operations on the graphical diagram defined for the LOGIC BLOCK object 204 and described further herein.

A CalcTreeView component 273 contains computer-executable instructions facilitating representing logic instructions in two formats: alphabetical and logical groups. See, Instruction Tree panel in FIG. 8. The CalcTreeView component 273 facilitates adding new logical diagram elements (logic instructions) to the graphical view of the LOGIC BLOCK object 204 via a drag-n-drop capability. An alphabetical tree view lists the instructions in alphabetical order. A grouped tree view groups the instructions into the following categories; Arithmetic, Boolean, Cascade And Propagation, Clear And Set, Error Control, Input And Output, Logic, Memory and Stack, Program Control, Random, Timing, and Trigonometric.

An ALDWatchDlg component 274 comprises computer-executable instructions facilitating displaying the values for logic block inputs, outputs, and memory registers that are on scan in a process control database or other source of live/simulated process control system parameter values. In an exemplary embodiment, the ALDWatchDlg component 274 contains a data grid bound to a list of live data sources (objects). When each live data object receives notification that its value has changed, the value is updated in a live data field next to a graphical diagram shape and in a watch dialog box within the graphical view of the LOGIC BLOCK object 204.

An InputInstructionConfigDlg component 275 comprises computer-executable instructions facilitating presentation of a dialog for configuring input instructions on a selected logic diagram shape. The input instruction configuration dialog allows the user to pick which instruction type to configure for the selected shape. By way of example, the dialog box shows available instruction types that can be configured for the shape. When the user selects an instruction type, the instruction configuration section in the dialog displays available configuration types. Depending on the selected configuration type, the user is able to configure the instruction's operand or constant. The InputInstructionConfigDlg component 275 also validates the instruction configuration. If no error is reported, the configuration is stored in the appropriate cells on a datastructure associated with the graphical shape. By way of example, a graphical shape can be configured to represent one of the following input instruction types: IN, INB, INH, INL, INR, INS.

An InstructionConfigDlg1 component 276 allows a user to configure, via the graphical editor interface, an operand and comment for a logic diagram shape. The InstructionConfigDlg1 component 276 validates the instruction configuration upon completion of editing. If no error is reported from validation, the configuration is stored in the appropriate cells of the graphical block diagram shape. By way of example, the following logic instructions are configured by the InstructionConfigDlg1 component 276: CLM, LAC, LACI, RCL, STM, STMI, SSF, SSI, SSN, SSP, SST, SSZ, CBD, CE, COO, OUT, PRI, PRO, PRP, RBD, RCN, RE, REL, RON, ROO, RQE, RQL, SAC, SBD, SE, SEC, SOO, STH, STL.

An InstructionConfigDlg2 component 277 allows a user to configure operands and/or a constant, and a comment for a logic diagram shape. Depending on a configuration type, the user configures the instructions operands and/or a constant. The InstructionConfigDlg2 component 277 validates the instruction configuration. If no error is reported from validation, the configuration is stored in the appropriate cells on the graphical shape definition structure. The following logic instructions are configured by the InstructionConfigDlg2 component 277: DIV, EXP, IDIV, SUB, CLR, SET, SETB, CLRB, TSTB, SWP, and GTI.

An InstructionConfigDlg3 component 278 allows a user to configure an operand or constant, and a comment for the shape. Depending on the configuration type, the user configures the instructions operands and/or constant via a supported dialog box user interface. The InstructionConfigDlg3 component 278 validates the instruction configuration, and if no error is reported from validation, the configuration is stored in the appropriate cells on the graphical shape definition structure. The following logic instructions are configured by the InstructionConfigDlg3 component 278: DEC, INC, DOFF, DON, and OSP.

A NOPConfigDlg component 279 allows a user to configure a NOP graphical diagram shape. The NOPConfigDlg component 279 allows the user to specify the number of NOP instructions the NOP shape represents. By way of example, the number of instructions is between 1 and 10. Through the NOP dialog box, a user designates that the shape will represent a NOP instruction or an empty step. The graphical shape will display "nop" for empty step and "NOP" for NOP instruction.

A PolyadicConfigDlg component 280 allows a user to configure polyadic instructions. Polyadic instructions are instructions that can process a specified (variable) number of inputs. The PolyadicConfigDlg component 280 allows the user to specify the instruction configuration. Depending on the configuration type, the user configures the instructions operands and/or a constant. The PolyadicConfigDlg component 280 comprises computer-executable instructions for providing a dialog box allowing the user to configure the Number of Inputs for instruction configurations of type XXX and XXX N. ADD and MUL instructions only display this option for configurations of type XXX N. The number of inputs is between 2 and 24. Instruction configurations of type XXX N allow users to select between an Auto and a Manual mode for calculating N. In Auto mode, the editor 202 automatically calculates N based on a number of connections to the shape. In Manual mode, the user will configure N and an asterisk will be displayed next to N on the graphical shape. The PolyadicConfigDlg component 280 validates the polyadic instruction configuration. If no error is reported from validation, the configuration is stored in appropriate cells on the graphical shape. If the number of inputs changes, the shape is automatically resized to accommodate the new number of inputs. By way of example, the following logic instructions are configured by the PolyadicConfigDlg component 280: ADD, AND, ANDX, AVE, MAX, MIN, MUL, NAND, NANX, NOR, NORX, NXOR, NXOX, OR, ORX, XOR, XORX, MEDN.

A PRGENDConfigDlg component 281 includes computer executable instructions supporting a dialog box that allows a user to configure a program end graphical shape. More particularly, the dialog box enables the user to configure the step number representing the end of the program.

A CalcKeyWords component 282 categorizes logic instructions into logical groups (Arithmetic, Boolean, Memory and Stack, Program Control, etc) and creates lists of logic instructions supported by block type. The CalcKeyWords component 282 implements functionality to retrieve instructions, check operand validity, check operand data type, and step number based on block type. Instances of the CalcKeyWords component 282 class return the number of memory registers, the number of supported Boolean, Real, Integer, and Long inputs and outputs.

A CalcComp component 283 is a base class from which all CalcComp classes are derived. By way of example, the CalcComp class implements base functionality to import RPN, connect to other CalcComp object instances, calculate its instruction, validate its RPN, and support live data. The CalcComp class comprises computer-executable instructions for implementing methods to support a LOGIC BLOCK object's configuration dialog specifying the LOGIC BLOCK's instruction configuration and operands. Each CalcComp instance has a unique id and contains a reference to a graphical shape and a BlockComp object instance. See, BlockComp component 284. By way of example, each CalcComp subclass and instance contains lists of connected inputs, outputs, and branches. The CalcComp base class contains static methods to: create CalcComp objects, specify the object's configuration dialog, and support automatic diagram layout.

A BlockComp component 284 is a class that manages an internal model of CalcComp object instances for a LOGIC BLOCK object instance. The BlockComp component 284 class implements methods for adding and deleting CalcComp objects. The BlockComp component 284 object class includes computer-executable instructions for implementing methods to: generate RPN listings from lists of CalcComp objects associated with a graphical diagram, create and layout the diagram of graphical shapes, export the diagram, and validate the generated RPN listing.

A BlockComps component 285 is a class that manages a list of BlockComp objects. The BlockComps component 285 comprises computer-executable instructions for implementing indexers to access a BlockComp object in a collection by name and index. The BlockComps component 285 provides the capability to: add and delete a BlockComp from a collection and find a CalcComp by graphical shape or unique id.

A ConnectionSettings component 286 is a helper class that applies Boolean and real connection settings to connections in a diagram. The ConnectionSettings component 286 supports: reading the connection settings from a configuration database; applying connection settings when a block diagram is first loaded (in case the settings have changed since the last time the diagram was loaded); and applying connection settings when a user creates a connection, deletes a connection, changes an instruction configuration, and when the properties are modified in an associated connection settings dialog.

A ConnectionSupport component 287 contains computer-executable instructions for carrying out a set of functions for traversing connections. The ConnectionSupport component 287 includes: a recursive method that builds an array of branch components that are the source of a connection; a method that builds a list of input components in an order that the RPN is generated; and methods for adding and deleting control connection points.

A ConnectionValidation component 288 contains computer-executable validation instructions performed, for example, when a user attempts to create a connection between two components on the diagram. The validation operations return one of the following connection statuses: Error, Redirect, and OK. If OK is returned, the connection is created. If Redirect is returned, then a connection will automatically be created and redirected to the connection point. If the validation operation returns an Error status, the connection will not be created. In an exemplary embodiment, prior to creating a connection between two components, connection validation is run to confirm that a specified connection is allowed. By way of example, the ConnectionValidation component 288 supports performing the following connection validation checks:

A connection from the input of one component to the input of another component is not allowed.

A connection from the output of one component to the output of another component is not allowed.

If the component does not support fan-out and is already connected to the input of another component, another connection to an input on another component will not be allowed.

A connection cannot be created if another connection is already connected to a same connection point.

A fan-in connection is not allowed except if the connection comes from a same branch component.

A CHN instruction can only be connected to a DON, DOFF, or OSP instruction.

Back loop connections are not allowed.

An InstructionResizer component 289 contains computer executable instructions implementing logic to resize a LOGIC BLOCK object 204 component based on a number of configured input connection points assigned to the LOGIC BLOCK object 204. The InstructionResizer component 289 class is utilized during diagram creation and when the number of inputs has changed for the component. The InstructionResizer class is responsible for adding and deleting connection points, adding and deleting operand shapes, repositioning connections to the component, and expanding and collapsing the graphical shape for the LOGIC BLOCK object 204.

An RPNValidation component 290 is a class including computer-executable instructions for implementing static methods used during RPN validation. The RPNValidation component 290 class contains validation strings and error codes for each error and warning. The RPNValidation component 290 validates the RPN for a component by invoking a validate method on a CalcComp. The validate method builds an array containing any errors and warnings arising from the validation procedure.

A RegExpEditor component 291 allows a user to enter a regular expression formula and generates RPN for the entered formula. The RegExpEditor component 291 converts the given regular expression into both: optimized RPN code and non-optimized RPN code. The conversion from regular expression to RPN code is done through computer-executable instructions performing the following steps:

The Regular Expression is converted into tokens. The conversion algorithm is based on a shunting algorithm that is modified to support unary negations and functions.

The tokens are converted into instructions.

The RPN Code is generated from the instructions.

Any errors that occur during the conversion method are displayed in an error text box.

An ALDParamField component 292 sends notification whenever its BlockName.Parameter value has changed in a control processor (live data source for the parameter). The ALDParamField component 292 object instances are used by ALDCalcErrorField object instances to send Error Codes and STEP Number notifications for a runtime error that occurred in the control processor.

An ALDCalcErrorField component 293 creates two ALDParamField objects. One that subscribes to a LOGIC BLOCK object's "PERROR" attribute and another that subscribes to an STERR attribute. The ALDCalcErrorField component 293 object instances notify a user when a syntax or runtime error occurs in the control processor. When a syntax or runtime error occurs the ALDCalcErrorField component 293 object instance retrieves the values from the PERROR and STERR attributes and formulates an error message. The error message is then sent through the object's delegates and ultimately displayed in the graphical editor output window. See, FIG. 8.

An ALDCalcMAField component 294 comprises computer-executable instructions for subscribing to the LOGIC BLOCK object's manual/auto mode parameter. The ALDCalcMAField component 294 contains a picture box representing the AUTO or MANUAL mode of the logic block. The user can interact with this object by toggling the mode between AUTO and MANUAL thus changing the LOGIC BLOCK object's mode in the control processor.

An ALDVisioCalcField component 295 comprises computer-executable instructions for updating a live data field in response to changes to a corresponding parameter value in a control processor. The ALDVisioCalcField component 295 is associated with the logic block's input, or output, or memory register in the control processor. The live data field in the diagram is updated when the value in the CP changes. When live data is first started, the ALDVisioCalcField component 295 object customizes its live data component based on live data options. The ALDVisioCalcField object updates its live data component upon notification from a source of live process data (e.g., a control database server) when a value of a parameter in the corresponding control processor changes. If the ALDVisioCalcField object's type is Boolean and Boolean coloring is enabled in the Live Data options, then the live data component will display the color for True value or another color for False value. If the ALDVisioCalcField object's type is not Boolean, the live data component will display the value read from the control processor.

An ALDParameters component 296 comprises computer-executable instructions for maintaining information for starting a live data session. The ALDParameters component 296 object instances contain the following information:

The name of a deployed process control database server.

The name of a compound to which the block is assigned.

The LOGIC BLOCK name and period.

Memory registers on scan need to be polled in the process control database server. The frequency at which the registers are polled is based on the block period.

An ALDRandomProvider component 297 is a class comprising computer-executable instructions to simulate live data when the editor 202 is in a preview mode. The ALDRandomProvider component 297 object instances are used during preview mode to simulate Boolean, integer, and real values. Each method generates a random value between specified minimum and maximum ranges.

A MxSimAttribute component 298 implements an attribute interface except that provides simulated values without putting any logic block input, output, and memory registers on scan in the control database server.

Attention is directed to FIG. 3 that enumerates a set of methods comprising the application program interface of the above mentioned CalcComp component 283. The CalcComp component 283 is the base class for instructions (e.g., ADD, SUB, MAX 2, etc.) represented in the instruction tree depicted in the graphical logic editor user interface depicted in FIG. 8.

A SupportOutputs( ) method 300 returns "true" if the instruction instance has an output connection point, and otherwise returns "false."

A GetMaxNumberOperands( ) method 302 returns a value corresponding to the maximum number of operands supported by an instruction.

A CalcMyInstructions( ) method 304 generates RPN code corresponding to the instruction instance.

An Import( ) method 306 takes the number of tokens and extracts the instruction, number of connections, or operands and/or constant, and comment, and sets the appropriate cells on a corresponding graphical (e.g., VISIO) shape. The number of tokens and token type determines an instruction type. In the case of polyadic instructions, if the specified number of inputs or the instruction type is not equal to the default for the instruction form, then the graphical shape is automatically resized and displays connected operand shapes and connectable input and output connection points.

A SupportsFanOut( ) method 308 returns "true" if the instruction supports fan-out.

A HasFanOut( ) method 310 initially checks whether the instruction instance supports fan-out. If fan-out is supported and the instruction output is connected to more than one component, then "true" is returned. Otherwise, false is returned.

A Connect( ) method 312 connects a designated instruction instance to an input connection point on the graphical image of the instruction. If the instruction has a branch dependency the stack is cleared. In a case of a polyadic instruction all instructions on the stack are connected to the instruction. If the component has a branch dependency, then all instructions on the stack are chained to the first connectable input, otherwise connected to each available input. If the instructions are chained and the instruction pushes operands onto the stack, the contents of the stack are cleared except for the last pushed instruction. This instruction is then pushed onto the stack to connect to the next instruction.

A StartALD( ) method 314 creates a live data field next to "Input" and "Output" components that handle a LOGIC BLOCK's input, output, and memory registers. For polyadic shapes, a live data field is created next to each operand shape. If Boolean coloring is enabled in the live data options, and the component reads or writes to a Boolean input or output, a live data field is not created. The instruction shape will change color based on the configured colors for "true" and "false" states.

A CalcBoundingRectangle( ) method 316 calculates a bounding rectangle for the instruction. For polyadic shapes the bounding rectangle includes all operand shapes and connection lines.

A SetLocation( ) method 318, invoked during layout of sets the location of the instruction's associated graphical shape on a view (canvas) of a LOGIC BLOCK containing the instruction.

A MyInstructionSet( ) method 320 specifies an available instruction configuration based on the type of LOGIC BLOCK currently being edited.

A MyOperands( ) method 322 specifies an available set of operands based on the type of LOGIC BLOCK currently being edited.

An InvOperand( ) method 324 indicates whether a specified operand can be inverted.

A FindRelatedShapes( ) method 326 iteratively traverses all connections to the instruction. If the connection is connected to an input, output, or branch connection of another instruction, then the instruction on the other end of the connection is placed in an appropriate connected instruction list.

A HasBranchDependency( ) method 328 returns "true" is a branch instruction jumps to the instruction (otherwise returns "false").

A ComponentType( ) method 330 specifies the type of instruction (component). In the exemplary embodiment the available instruction types include: Boolean, real or undefined. In some circumstances the component type is dependent on a configured operand of the instruction.

An IsBranch( ) method 332 returns true is an instruction is a branch instruction.

A GetDialogForType( ) method 334 returns a type of configuration dialog that is displayed when a user double-clicks on the graphical shape is displayed on the graphical editor canvas (thereby launching the dialog).

A CreateNew( ) method 336 creates a new graphical instruction object for a designated instruction dragged/dropped from the instruction pallet onto the canvas of the graphical editor interface. A new instruction object instance is created in the system's internal model and associated with the graphical shape selected/displayed on the graphical editor interface's canvas.

A GetOtherShape( ) method 340 retrieves a graphical shape at another end of a specified connection point.

A Validate( ) method 342 verifies the RPN steps generated for the instruction.

Each of the above-described methods is called at various times during the life of an instruction object/template including: creating a new instruction instance, editing an instruction instance, and saving the instance as part of defined LOGIC BLOCK object.

Having described the general architecture of a LOGIC BLOCK editor environment and structure of an exemplary embodiment, attention is directed to a set of complimentary/dual editor modes of operation (i.e., textual and graphical) supported by the LOGIC BLOCK editor 202. The editor 202 supports creating/modifying a LOGIC BLOCK object—a template or instance of, for example, type CALC, CALCA, MATH or LOGIC—using either a textual RPN editor interface (RPN Editor) or graphical function block diagram editor interface (FBD Editor). In an exemplary embodiment, both the RPN Editor and the FBD Editor are accessible via tabs on an interface of the editor 202. Any changes to a LOGIC BLOCK object/template definition entered via either the FBD Editor or the RPN Editor of the editor 202 are propagated to both a graphics portion (e.g., portion 610) and the text portion (e.g., portion 620) of the LOGIC BLOCK object (e.g., LOGIC BLOCK object 600). The editor 202 supports "locking" LOGIC BLOCK templates. Changes made to a locked LOGIC BLOCK are propagated to all derived children and instances of a locked LOGIC BLOCK.

Figure 4:
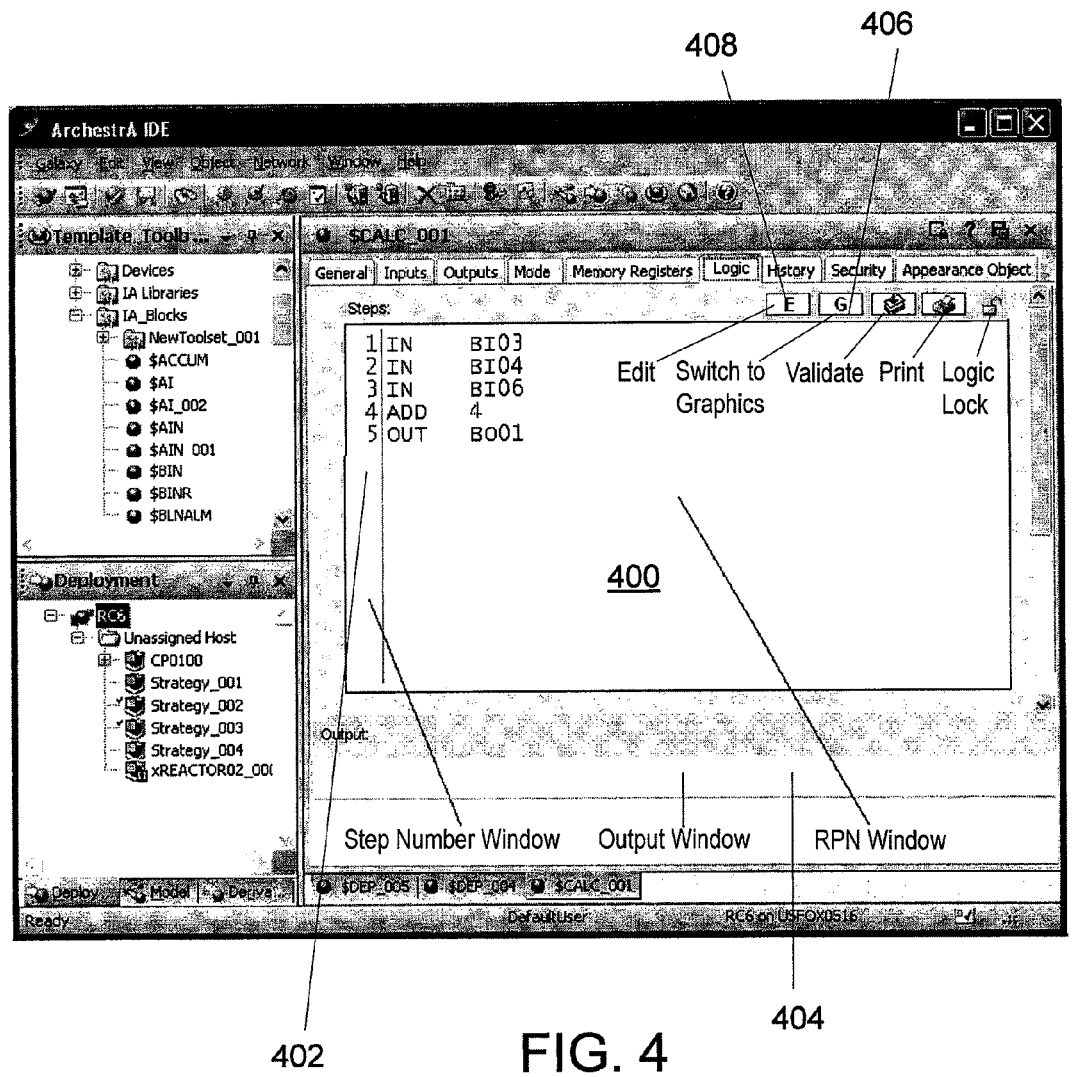
FIG. 4 provides an exemplary textual editor interface.

The RPN editor functionality is described herein with reference to FIG. 4 that provides an exemplary textual editor interface. In the exemplary embodiment, the RPN editor interface enables a user to edit a LOGIC BLOCK's step attributes presented in RPN format. The RPN editor interface includes an RPN Window 400 where the user edits the RPN text (e.g., text portion 620) of the LOGIC BLOCK object.

In an exemplary embodiment, the RPN Window 400's implementation incorporates Microsoft's Rich Text Control. Each line in the RPN Window 400 represents one STEP attribute of the LOGIC BLOCK. The RPN Window 400 supports standard text editing commands including: copy/paste text, undo/redo, insert new lines (steps), and find/replace. In addition the RPN editor supports configuring colors for types of text (e.g., instructions, operands, constants, and comments). A step number window 402 (read only) lists sequential step numbers for the displayed RPN text instructions.

Some of the instructions in the RPN steps reference other steps. The RPN editor supports two ways to reference other steps. First, steps are referenced directly. In the example logic segment provided below, instruction BIT 3 references step number 3. The RPN Editor does not automatically reevaluate references when user edits RPN code.

01 BIT 3
02 ADD
03 SUB

Second, steps are referenced indirectly through a label. In the example provided below, a user associates a label (L1) with a step containing the "SUB" instruction.

01 BIT L1
02 ADD
L1:
03 SUB

The line containing the label "L1:" is not counted as a step, and when the RPN logic is saved, the editor 202 converts the label into an actual step number (e.g., step 03) and saves the converted RPN code into the LOGIC BLOCK object's STEPnn attributes.

An output window 404 presents results of validation by the editor 202. During validation a variety of RPN syntax checks are performed including: exceeding steps limit for the LOGIC BLOCK, invalid step syntax, invalid instruction, invalid operand, and backward jumps (e.g., GTO referencing a previous step). If any errors are identified during validation of the RPN steps, then appropriate message are listed within the output window 404. Validation is invoked, for example, by selecting a validate button.

A graphics mode button 406, when selected, causes the editor 202 to switch to a graphical FBD editor mode. During the switch to the graphical mode the editor 202 executes RPN-to-graphics conversion procedures, comprising computer-executable instructions, to automatically render a graphical function block diagram (FBD) corresponding to the instructions represented in the RPN steps. Thereafter, if a user switches back to the RPN editor mode from the FBD editor mode, the RPN editor will automatically generate the RPN steps from the FBD definition of the LOGIC BLOCK object. In an exemplary embodiment, the RPN editor initially presents the instructions in "read-only" mode (to prevent inadvertent editing). A user removes the "read-only" restriction by selecting the Edit button 408.

A context menu (not shown) allows users to invoke a variety of functions via dialog boxes including: Import/Export LOGIC BLOCK, designate colors/fonts, Find/Replace, and a Library Browser.

Figure 5:
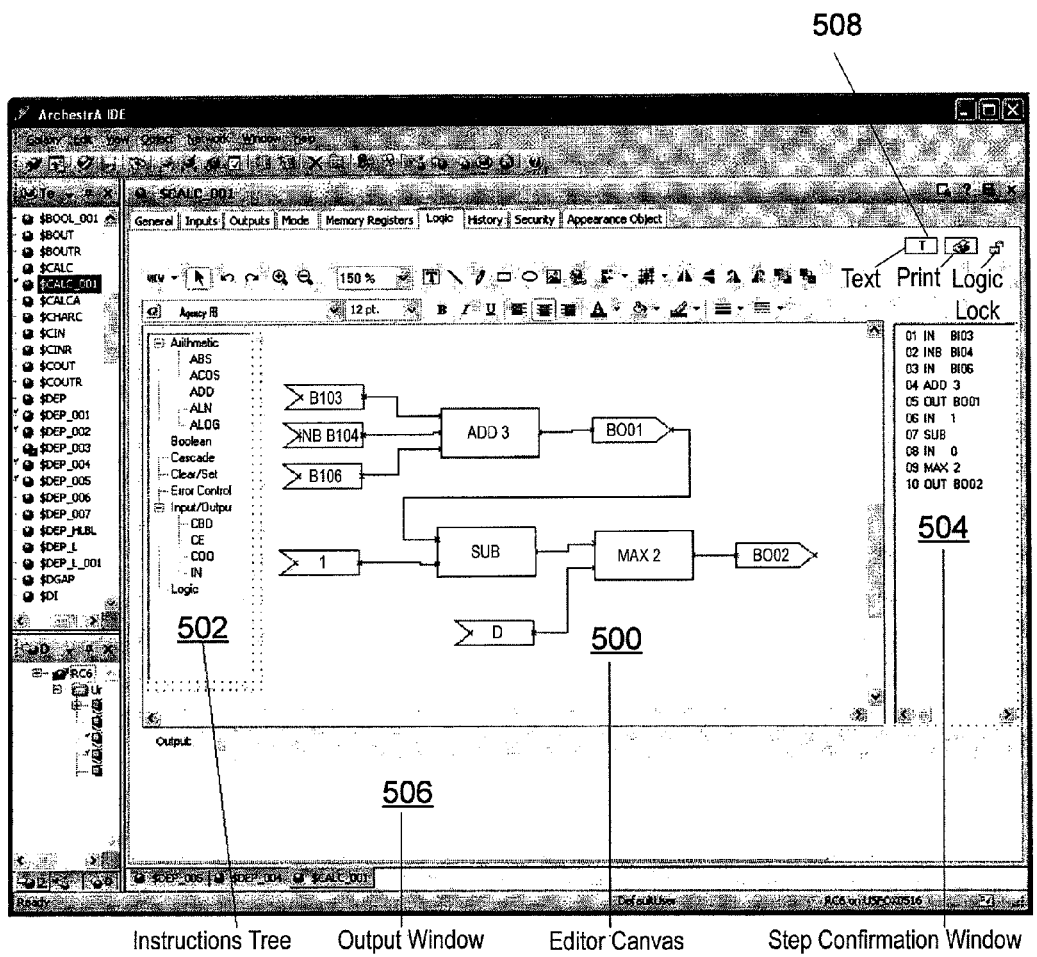
FIG. 5 provides an exemplary graphical editor interface supported by a LOGIC BLOCK editor supporting graphical and textual LOGIC BLOCK editing interfaces.

Having described the RPN editor user interface, attention is directed to an exemplary user interface for the graphical FBD editor depicted in FIG. 5. In the illustrative embodiment the FBN editor graphically depicts logic corresponding to a set of RPN steps of a LOGIC BLOCK in the form of a function block diagram (FBD). Within the FBD editor RPN logic is represented as a shape (also referred to as an "instruction"). A user creates a graphical representation of RPN logic by connecting input/outputs of the logic shapes on an FBD editor canvas 500.

The illustrative FBD editor interface depicted in FIG. 5 contains a set of subsections/panels. The editor canvas 500 provides a workspace where users edit the FBD diagram via GUI (e.g., drag/drop) actions. An instruction tree panel 502 provides a source/listing of program instructions (shapes) that are dragged and dropped by a user into the editor canvas 500 (e.g., a VISIO ActiveX control) to add a selected program instruction represented by a graphical shape to the graphically depicted logic of the LOGIC BLOCK. A shape's configuration dialog can be invoked on double-click of the logic shape. The FBD editor interface supports importing and exporting RPN and graphical diagrams to and from a designated file. The FBD editor interface also supports typical editor functionality/features including, for example, Find and Replace, Copy and Paste, Select All, Delete, and Undo/Redo.

The FBD editor interface of the LOGIC BLOCK editor 202 supports displaying live data via the editor canvas 500. The live data support allowing users to view values for inputs, outputs, memory registers in the logic block supplied by a process control system. Bi-directional data transfers are supported and therefore a user can enter new values via live data elements presented on the editor canvas 500 and update a controller. Alternatively a user can compare a current value in the controller with a corresponding configured value stored in a global configuration database and decide whether or not to update the value in the controller.

A non-editable RPN confirmation panel 504 displays RPN steps that the editor initially generates when a LOGIC BLOCK object is opened in the "graphical" editor mode (or a user switched to the graphical editor mode from the RPN text editor mode). The RPN logic displayed in the confirmation panel 504 is updated/synchronized with any changes made by a user to the graphical representation on the canvas 500. In an alternative embodiment, the editor 202 does not automatically update the RPN logic displayed in the confirmation panel 504 in response to changes by a user to the graphical representation in the canvas 800. When a user saves a current FBD display for the LOGIC BLOCK object 204, the RPN steps listed in the confirmation panel 504 are stored on the RPN STEPnn attributes on the LOGIC BLOCK object 204.

An output panel 506 displays text messages indicating results of validating a graphical FBD diagram's content/organization. Validation in the graphical editor mode parallels the tests performed in the text mode. Connections between instructions (shapes) must be proper and obey connection restrictions regarding termination point types.

A text mode button 508, when selected, causes the editor 202 to switch to the RPN text editor mode. During the switch to the RPN text editor mode, the editor 202 builds RPN from the graphical FBD displayed in the confirmation panel 504 during operation of the FBD editor.

Figure 6:
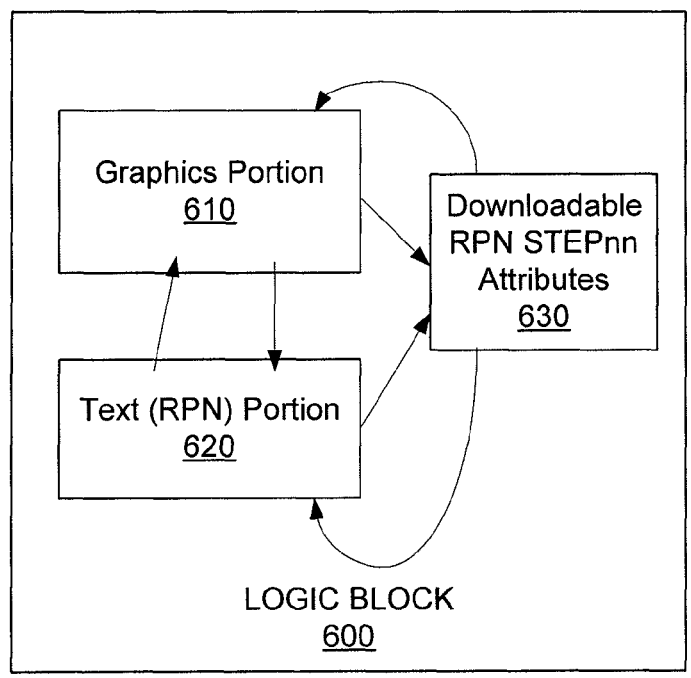
FIG. 6 depicts a set of programmable logic (steps) definition components for an exemplary LOGIC BLOCK object structure showing conversion/transformation paths supported by the LOGIC BLOCK editor in accordance with an exemplary embodiment.

Turning to FIG. 6, programmable logic (steps) definition components for an exemplary LOGIC BLOCK object 600 structure (e.g., LOGIC BLOCK 204) are depicted in a diagram showing conversion/transformation paths supported by the LOGIC BLOCK editor 202 in accordance with an exemplary embodiment. Each of the three previously discussed versions (one graphical, two text) are identified. Also, conversion paths supported by an exemplary embodiment of the LOGIC BLOCK editor 202 are depicted by arrows between each of three different forms of stored logic for a LOGIC BLOCK. In the illustrative embodiment, conversion paths exist for all formats. However, as explained further below, a special conversion operation potentially disconnects the RPN text and FBD graphical representations associated with the LOGIC BLOCK object 600 when a user switches from a text editor mode to a graphical editor mode.

In an exemplary embodiment a LOGIC BLOCK object 600 comprises a container that maintains programmable instructions in up to three formats: graphics in a graphics portion 610, editable source text instructions including text labels and developer comments in a text portion 620, and downloadable/executable RPN instructions in a STEPnn attributes portion 630. Disconnected RPN code (see DisconnectedRPNCode 256) is also potentially saved. The graphics portion 610 defines a graphical view of the LOGIC BLOCK object 600 in the form of a function block diagram (FBD). The graphics portion 610 includes, by way of example, a VISIO "blob" specifying a graphics editor and graphics file for rendering the graphical representation of the LOGIC BLOCK object 600 on an editor canvas. The text portion 620 includes, for example, a (non-compiled) text listing of instructions/comments defining the LOGIC BLOCK object 600 in the form of Reverse Polish Notation (RPN) steps that are editable via a text editor user interface of the LOGIC BLOCK editor 202 (see, FIG. 4). Alternatively, other programming languages/instruction types are used in place of the RPN steps. In the illustrative example, the RPN steps in the STEPnn attributes portion 630 are deployed and executed, by way of example, on a control processor operating at a regulatory control level of a process/plant operating environment.

The LOGIC BLOCK object 600 is saved as a template in a library (not shown) including previously defined control objects (e.g., LOGIC BLOCKs, control blocks, etc.). Thereafter the library of previously defined block object templates is accessed by a control strategy editor. The control strategy editor presents the previously defined block objects, including the LOGIC BLOCK objects, to a user via a strategy editor interface to enable the user to define an overall control strategy that includes one or more regulatory control blocks defined and stored in the control block library. A user, through the control strategy editor, combines/connects LOGIC BLOCKs created/configured using a graphical user interface (GUI) canvas to define an overall strategy comprising a set of related block objects. The strategy editor supports opening a previously defined LOGIC BLOCK on a logic strategy canvas for editing via the LOGIC BLOCK editor 202. The changes to a LOGIC BLOCK object applied via the control strategy editor are limited to the particular LOGIC BLOCK instance selected on the strategy canvas. The parent LOGIC BLOCK template remains unchanged. Furthermore, the strategy editor supports creating and manipulating control data. When saved, the resulting logic strategy is stored as a logic strategy container including referenced LOGIC BLOCK instances and any additional non-executable ("dummy") graphics.

Attention is directed to the arrows connecting the three instruction formats depicted in FIG. 6. Arrows originating from the graphics portion 310 and the text portion 320 indicate, by way of example, relationships between the three supported instruction formats with regard to saving edited instructions defining the LOGIC BLOCK object 300 and switching between graphical and text editor interfaces while editing a LOGIC BLOCK object. The arrows originating from the STEPnn attributes portion 330 are indicative of using the downloadable RPN steps contained therein to create a graphical or text editor version/view of a LOGIC BLOCK object's RPN instructions for use by either the graphical or textual interfaces of the editor 202. Each path between the three supported instruction formats identified in FIG. 6 is discussed herein below.

In an illustrative embodiment, when the editor 202 saves a definition of the LOGIC BLOCK object 300 from a graphical editor interface (see, e.g., FIG. 5), the graphical view/representation of the LOGIC BLOCK is stored in the graphics portion 610. Furthermore, during a save operation from the graphical editor mode, RPN instruction information is extracted/distilled from the graphical definition, converted into RPN instruction text, and then rendered and saved to the STEPnn attributes portion 630. An arrow connecting the graphics portion 610 to the STEPnn attributes portion 630 in FIG. 6 indicates the conversion from a graphical representation of RPN logic to a set of downloadable RPN STEPnn attributes.

When the editor 202 saves an RPN logic definition of the LOGIC BLOCK object 600 from a textual editor interface (see, e.g., FIG. 4), the instruction information is stored in the text portion 620. The instruction information is also converted and saved to the STEPnn attributes portion 630. In the illustrative example, instructions defined in text format via the text editor interface 202 are not converted and saved to the graphics portion 610.

Neither the graphical nor the text editors save edited logic in all supported formats during a save operation. To ensure a most up-to date version is utilized when a previously stored LOGIC BLOCK object is reopened in the editor, the LastEditortype attribute 254 stores the editor mode when a last save occurred. The LastEditortype attribute 254 informs the editor of the last type of editor used (graphical or RPN) to edit/save a current version of the LOGIC BLOCK 600. Also, any errors or warnings generated during validation of LOGIC BLOCK instructions are stored as an attribute on the LOGIC BLOCK 600.

Having described a configuration computing system comprising a tangible computer-readable medium including computer-executable instructions for carrying out the LOGIC BLOCK editor 202, attention is directed to a series of flowcharts summarizing the synchronization/conversion capabilities and operations supported by the above-described LOGIC BLOCK editor 202. The aforementioned capabilities are facilitated by automated conversion logic incorporated into the editor 202 that automatically transforms RPN text into FBD graphics and vice versa.

An exemplary instruction synchronization scheme is described with reference to the three versions of instructions identified in the exemplary LOGIC BLOCK represented in FIG. 6. In the illustrative example, the downloadable RPN STEPnn attributes portion 630 contains the most recently saved definition of the LOGIC BLOCK object 600 in the form of RPN steps. Thus, in situations where a current graphical or text definition is not present in the graphics portion 610 or the text portion 620, respectively, of the LOGIC BLOCK object 600, the editor 202 extracts the instruction information from the RPN STEPnn attributes portion 630 and converts the information into the appropriate form for presentation via either the FBD graphical or RPN textual editor interfaces. In the illustrative example, if needed, the editor 202 extracts and converts, to corresponding graphical elements, step information from the RPN STEPnn attributes portion 630 to support a graphical editing session on the LOGIC BLOCK object 600. Similarly, the editor 202 is capable of extracting and converting the content of the STEPnn attributes to a corresponding listing of RPN text instructions displayable on the text editor interface.

Opening a Logic Block Via the Editor

Figure 7A:
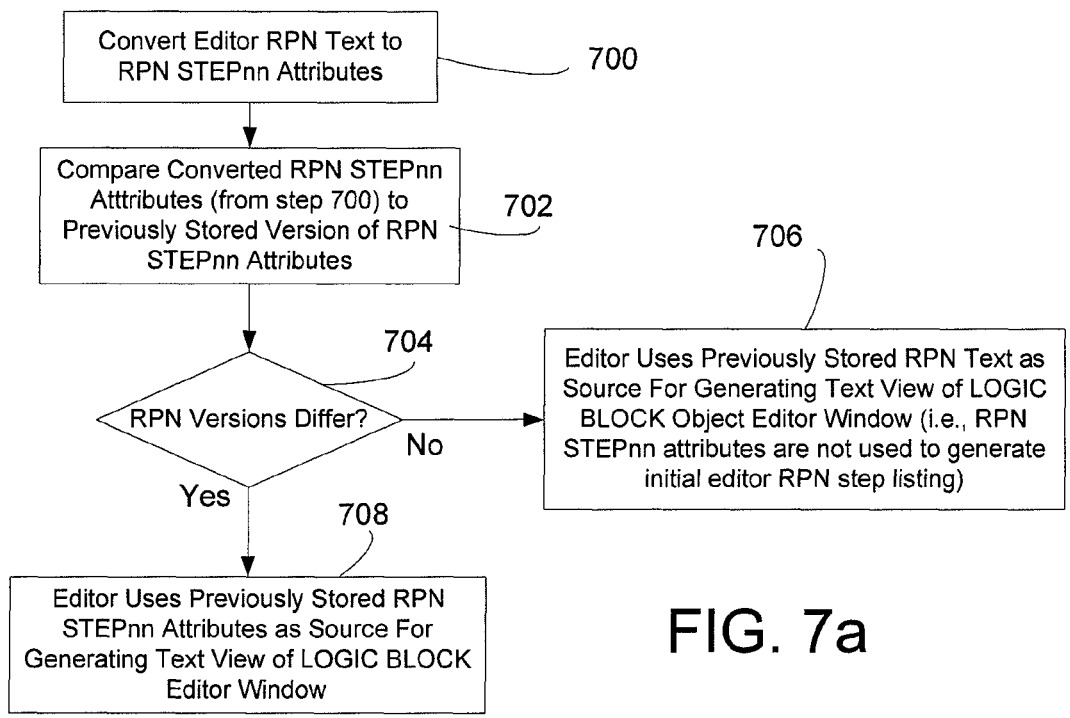
FIG. 7a, is a flowchart summarizing a set of steps that are performed in association with opening a LOGIC BLOCK object via the RPN text mode of the editor
Figure 7B:
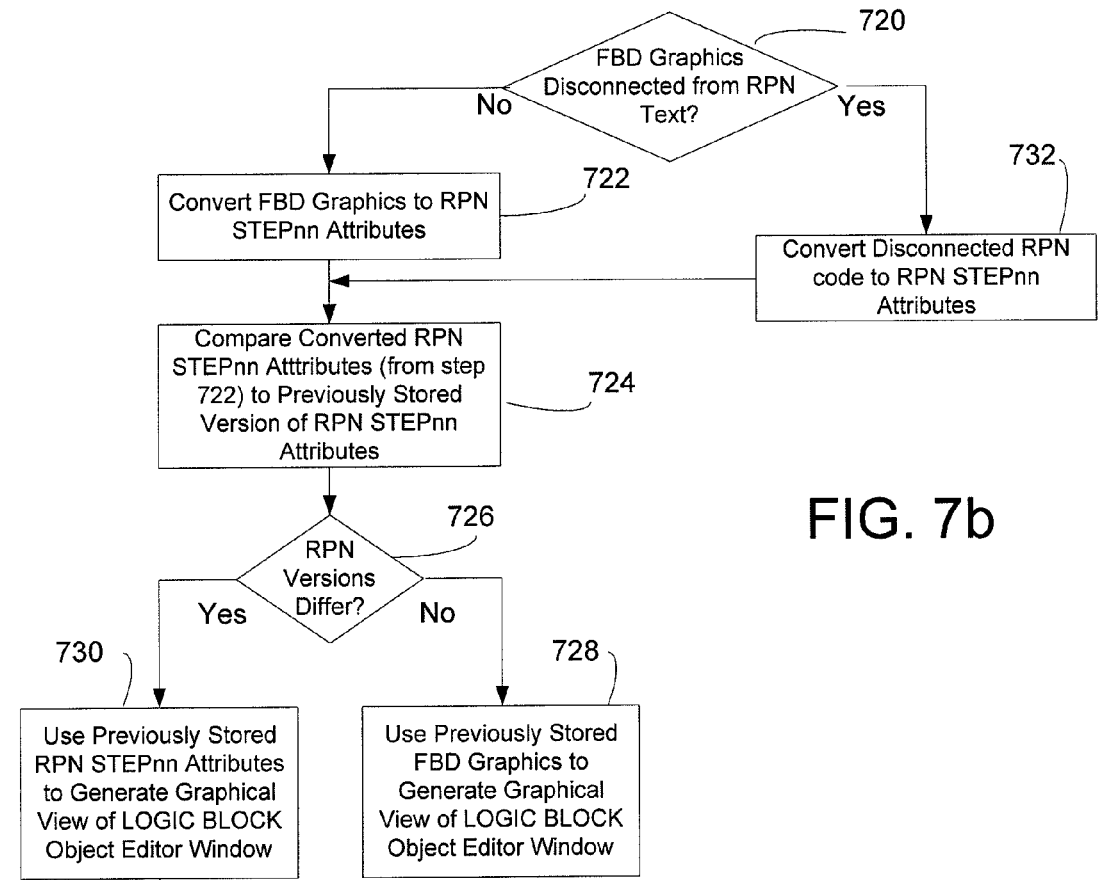
FIG. 7b, is a flowchart summarizing a set of steps that are performed in association with opening a LOGIC BLOCK object via the FBD graphics mode of the editor.

Before describing the steps summarized in FIGS. 7a and 7b, an exemplary decision process is described for determining which one of supported graphics/text editor modes within which a selected LOGIC BLOCK object is initially opened by the editor 202. In the exemplary embodiment, the initial editor mode is determined by the mode of the editor 202 when a last save operation occurred. The last editor mode is stored in the LastEditorType attribute 254 and is consulted by the editor 202 when a LOGIC BLOCK is opened. If a LOGIC BLOCK object has not previously been stored via the LOGIC BLOCK editor 202 and does not have any RPN text, then the FBD graphical editor mode is initially selected.

The illustrative steps depicted in FIGS. 7a and 7b, relate to ensuring use of a proper one of the three represented forms of the LOGIC BLOCK object (RPN text, graphics, and downloadable RPN STEPnn attributes) when the LOGIC BLOCK editor 202 is opened on a particular LOGIC BLOCK object (see, e.g., LOGIC BLOCK 600 in FIG. 6). Turning to FIG. 7a, a set of steps are summarized that are performed in association with opening a LOGIC BLOCK object via the RPN text mode of the editor 202. In the illustrative embodiment, the downloadable RPN STEPnn attributes format is treated as the dominant version to which the other versions are compared when a LOGIC BLOCK is opened in the editor. In the case where the LastEditorType attribute 254 indicates that the LOGIC BLOCK object 204 was last saved from the RPN text editor mode, synchronization between a last edited version and RPN STEPnn attributes is verified using the RPN text portion 620. During step 700 text instructions from the text portion 620 are converted to downloadable RPN logic instructions. The conversion procedure from RPN text to RPN STEPnn attributes is a straight-forward conversion procedure.

Next, during step 702 the editor 202 compares the converted RPN instructions to the RPN STEPnn attributes stored in the STEPnn attributes portion 630. Thereafter, at step 704 if the two versions are the same, then control passes to step 706. At step 706 the editor 202 utilizes the previously stored RPN text (e.g., text portion 620) to generate an initial view of the LOGIC BLOCK object's logic within the editor 202's text mode window. See, FIG. 4. If, at step 704, the RPN versions differ, then control passes to step 708. At step 708, the editor 202 generates a new version of the text portion 620 from the RPN STEPnn attributes portion 630 of the LOGIC BLOCK object 600 and displays the new RPN text in the text editor window.

Before describing synchronization procedures when the LOGIC BLOCK object 600 is opened in a graphical mode, a feature referred to herein as "disconnected diagram" is described. In the exemplary embodiment, conversion of a LOGIC BLOCK's RPN logic from the text (RPN) format to the graphical (function block diagram) format is a "many to one" relationship (i.e., multiple RPN text specifications can map to a same graphical function block diagram). More particularly, the RPN steps generated by the editor 202 and displayed in the confirmation panel 504 of the graphical editor interface window (see, FIG. 5) are, for example, optimized and potentially contain fewer instructions than the RPN entered by a user in the text editor interface. In this scenario the function block diagram created by the graphical mode of the editor 202 can be disconnected from the RPN text previously generated by the RPN text mode of the editor 202. After disconnection, a disconnected diagram is stored in the graphics portion 610. The RPN text that resulted in the disconnected status is stored in the DisconnectedRPNCode attribute 256 (for purposes of detecting future changes to the RPN text during transitions between the text and graphical modes of operation). The RPN instructions generated from the graphical FBD are not propagated to the RPN text portion 620 in the text editor or saved in the RPN STEPnn attributes 630. In an exemplary embodiment, when disconnection circumstances are detected, the text editor's RPN can be displayed alongside the disconnected RPN generated by the graphics editor in a dialog box. The user views the disconnected RPN to see what is different and can replace the RPN in the Text Editor with the RPN generated by the graphical editor mode and displayed in the confirmation panel 504 and thus avoid a disconnected diagram status.

Turning to FIG. 7b, a set of steps are summarized that are performed in association with opening a LOGIC BLOCK object via the FBD graphics mode of the editor 202. Initially, at step 720 if the graphical FBD is connected to the RPN text (i.e., the editor is not operating in a "disconnected diagram" mode), then control passes to step 722 wherein an FBD description from the graphics portion 610 is converted to downloadable RPN STEPnn attributes. The conversion procedure from FBD graphics to RPN text is described herein below with reference to FIG. 12.

Next, during step 724 the editor 202 compares the converted RPN STEPnn attributes (rendered from the graphics portion 610) to the RPN STEPnn attributes stored in the STEPnn attributes portion 630. Thereafter, at step 726 if the two versions are the same, then control passes to step 728. At step 728 the editor 202 utilizes the previously stored FBD graphics (e.g., graphics portion 610) to generate an initial graphical view of the LOGIC BLOCK object's function block diagram within the editor 202's graphic editor mode. If, at step 726, the RPN STEPnn attributes differ, then control passes to step 730. At step 730 the editor 202 generates a new version of the graphics portion 610 from the RPN STEPnn attributes portion 630 of the LOGIC BLOCK object 600.

Thereafter, at step 732 the editor 202 converts the graphical FBD to RPN STEPnn attributes. Next, at step 734 the editor 202 compares the converted RPN STEPnn attributes (from step 732) to a previously stored version of RPN STEPnn attributes (used to build the currently displayed FBD view) and changes the status of the LOGIC BLOCK object 600 to "connected" if the compared versions are the same.

Otherwise, if at step 720 the graphical FBD is disconnected from the RPN text, then control passes to step 732 wherein the RPN text from the DisconnectedRPNCode attribute of the LOGIC BLOCK is converted to downloadable RPN STEPnn attributes. The RPN STEPnn attributes are thereafter used to carry out step 724 described herein above.

Saving a Logic Block Definition from the Editor

In an exemplary embodiment, saving a current version of configured instructions/steps of the LOGIC BLOCK object 600 is asymmetric in the sense that different forms of the logic are stored based upon an editor mode from which the LOGIC BLOCK object 600 is saved. When a user saves RPN logic, the editor 202 validates the presently listed RPN logic. The editor then saves the RPN logic, the results of validation, FBD diagram (if available), and the currently active editor type (e.g., RPN) into the LOGIC BLOCK object's attributes. See, FIG. 2b described herein above. The content and storage location of various LOGIC BLOCK attributes varies in accordance with various alternative embodiments.

When a save operation is invoked by a user while in the RPN text editor mode (see, FIG. 4, the editor 202: (1) saves the current version of the RPN text into the text portion 620, and (2) converts the RPN text into downloadable RPN STEPnn attributes that are stored in the STEPnn attributes portion 630. The graphics portion 610 may not be up to date the next time the editor 202 opens the LOGIC BLOCK 600 in the graphical mode. Therefore, in the illustrative embodiment (see, FIG. 7a described herein above) special steps are taken to ensure that the editor 202 uses a most recently saved version of the RPN logic when opening the LOGIC BLOCK 600 through the graphical mode of the editor 202.

Some LOGIC BLOCK types limit the number of STEPnn attributes. However, the RPN Window supports entering more steps than can be saved into a block's STEPnn attributes. The RPN editor visually indicates "extra" steps, and during validation a message is generates to warn a user about the presence of "extra" steps. The extra steps are saved with RPN logic text but will not be saved into the LOGIC BLOCK object's STEPnn attributes. The RPN editor supports specifying comments that are stored in the RPN logic text, but the comments are not saved into the STEPnn attributes of the LOGIC BLOCK.

The save operation associated with the graphical mode of the editor 202 differs from the saver operation in the text editor mode. In addition to performing validation and recording any errors, when a save operation is invoked via the graphics editor mode the editor 202 performs the following save operations: (1) a copy of the graphical function block diagram for the LOGIC BLOCK 300 is saved in the graphics portion 310, and (2) the RPN text rendered in the confirmation panel 504 is converted to RPN STEPnn attributes and stored in the STEPnn attributes portion 330.

Switching Between Text/Graphic Editor Modes

1. Text-to-Graphic Editor Transition

In accordance with an exemplary embodiment, the editor 202 supports switching between the RPN text editor mode (see, FIG. 4) and the graphical (function block diagram) editor mode of operation (see, FIG. 5). If the editor is operating in the RPN text mode and switches to the graphical mode, then the following steps, summarized in FIG. 7c, are performed to synchronize the content of the text and graphics editor instruction definitions. Initially, during step 750 the editor determines whether the graphics portion 610 is currently holding a disconnected diagram (from the text portion 620). If the graphics portion 610 is not disconnected, then control passes to step 752. The editor 202, during step 752, converts the graphics portion 610 to RPN text format. Thereafter, at step 754 the converted RPN text is compared to the RPN text from the text portion 620.

If, at step 756, the passed and converted versions of the RPN (compared during step 754) are the same, then control passes to step 758, and the editor 202 uses the previously stored graphics portion 610 of the LOGIC BLOCK object 600 for generating the initial graphical editor view. Control then passes to the END.

If the versions differ, then control passes from step 756 to step 762 wherein the editor generates a new graphical FBD from the RPN text portion 620 of the LOGIC BLOCK object 600 for storage in the graphics portion 610. Details of how the graphical view is generated from the RPN instructions are described herein below with reference to FIGS. 8 and 10.

Thereafter, at step 764 the text portion 620 is compared to RPN text generated from the graphical representation generated during step 762 (i.e., the RPN displayed in confirmation panel 504). If, at step 766, the RPN text is the same in the versions compared during step 764, then the status of the diagram can be returned, if needed to "connected" status. Therefore, control passes to step 767 wherein if the diagram is currently connected, then control passes to the End (there is no need to change the status of an already "connected" diagram). Otherwise, if the diagram is currently disconnected, then control passes from step 767 to step 768. At step 768 the relationship between the graphics portion 610 and the text portion 620 is set to "connected" status. Control then passes to the End.

Alternatively, if the RPN versions are found to differ, then control passes from step 766 to step 770. Step 770 resolves the "connected" status in view of the differences between RPN text versions detected during step 764. A user is given the option of: (1) updating the text portion 620 to contain the RPN text generated from the new graphical FBD created during step 762 (in which case the status will be "connected"), or (2) keep the old RPN text presently contained in the text portion 620 (in which case the status will be "disconnected"). If the "disconnected" status is selected, then a copy of the current RPN text within the text portion 610 is stored in the DisconnectedRPNCode attribute 256.

Returning to step 750, if the FBD diagram is currently disconnected from the RPN text, then control passes to step 772 to potentially by-pass generating a new diagram in the graphics editor mode. In particular, the editor 202 compares the RPN text in the text portion 610 to the RPN text stored in the DisconnectedRPNCode attribute 256 that was used to generate the current version of the disconnected diagram. As noted above, if these two RPN versions are the same, then control passes to step 758. Otherwise, control passes to step 762.

2. Graphics-to-Text Editor Transition

Figure 7D:
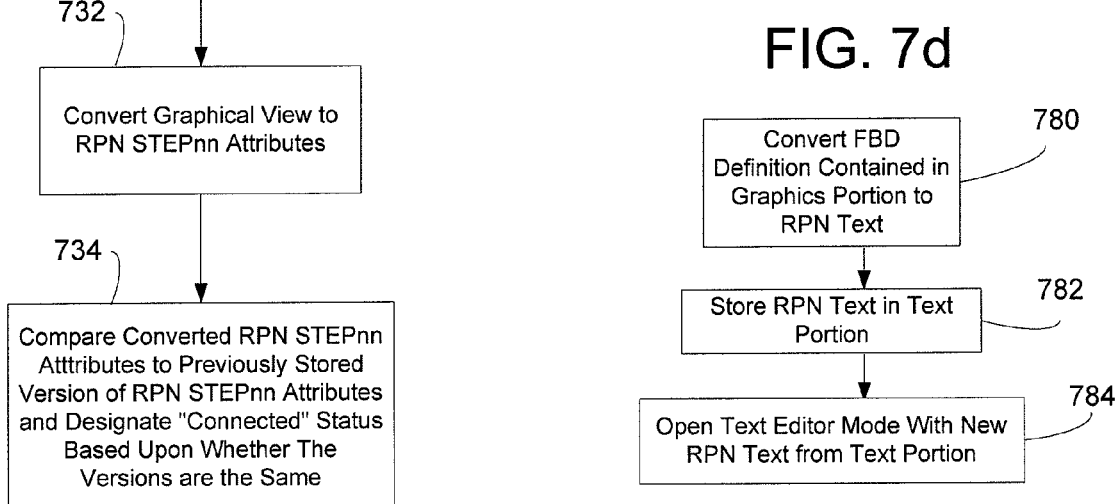
FIG. 7d, is a flowchart summarizing a set of steps performed to synchronize the content of the text and graphics editor instruction definitions when the editor switches from graphics to text mode.
Figure 7C:
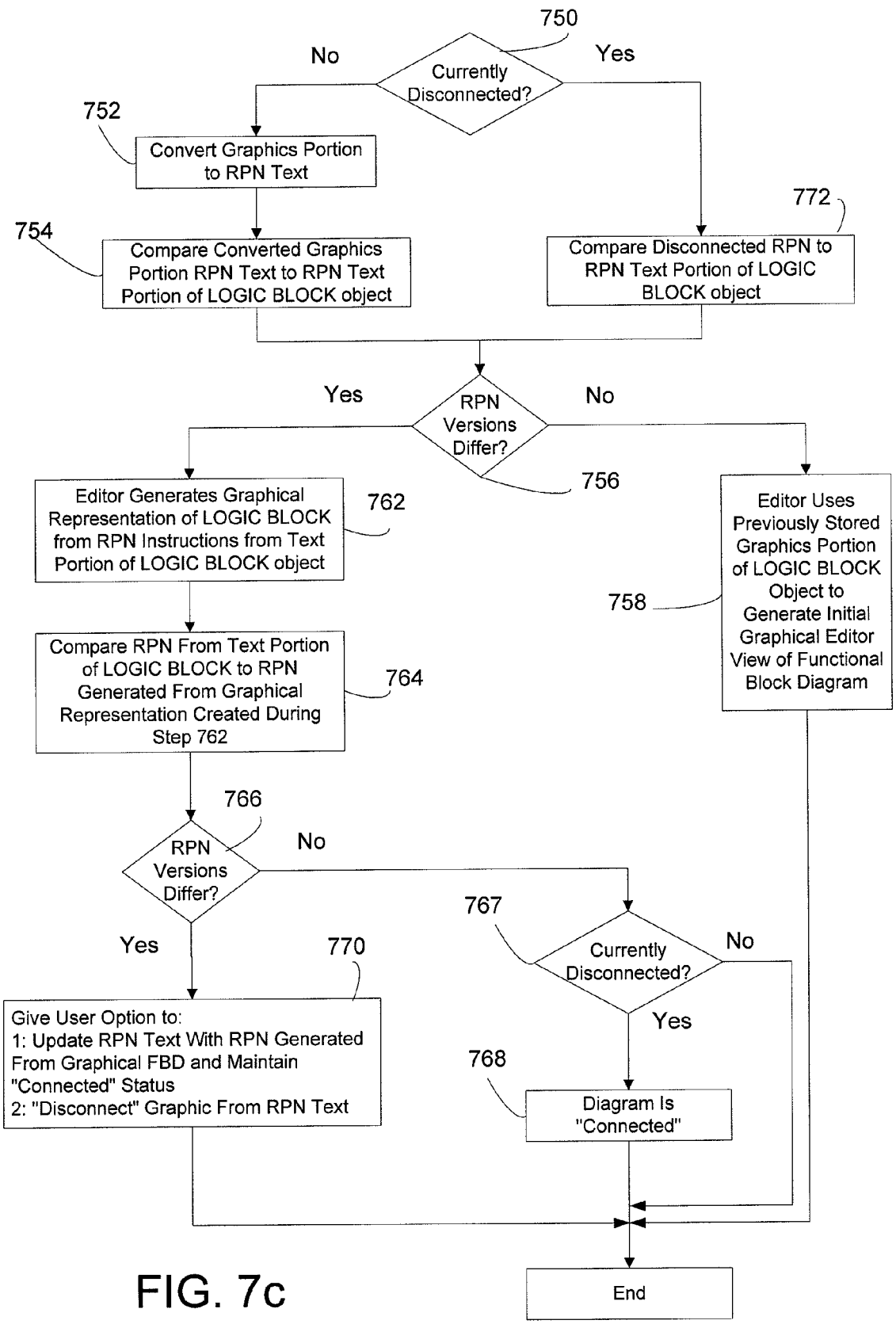
FIG. 7c, is a flowchart summarizing a set of steps for synchronizing the content of the text and graphics editor instruction definitions when the editor switches from text to graphics mode.

Turning to FIG. 7d, the editor 202 also supports switching from the graphical mode to the RPN text editor mode. The transition is considerably simpler than the RPN-to-Graphics transition. By way of example, during step 780 the editor 202 converts the current FBD graphics definition, stored within the graphics portion 610 of the LOGIC BLOCK object 600, into RPN text. The RPN text corresponds to the text displayed in the confirmation panel 504 of the graphical editor window depicted in FIG. 5. The conversion from a graphics definition to RPN text is described herein below with reference to FIG. 12

Thereafter, during step 782 the editor 202 stores the RPN text generated during step 782 in the text portion 620 of the LOGIC BLOCK object 600. During step 784 the editor 202 opens the RPN text editor mode (see, FIG. 4) and populates the RPN panel 400 with the RPN text from the text portion 620.

Generating FBD Graphics from RPN Text

Turning now to FIG. 8, a set of steps are summarized for converting (i.e., importing) designated RPN text into FBD graphics. In the exemplary embodiment importing RPN text into a graphical FBD is carried out by a method invoked by the RPN editor mode of the editor 202 designating a text file containing the RPN text. The method comprises a number of stages identified in FIG. 8 and described herein below. In the illustrative embodiment the importation procedure is carried out by importation logic comprising computer executable instructions read from a physical computer-readable medium of a computing device.

During stage 800 the importation logic matches labels in the RPN instruction list to step numbers. The RPN instruction list is initially traversed to identify lines that are labels. A label can be used in the RPN text editor mode of the editor 202 to replace a step number to which a "Branch" instruction jumps. Labels allow the RPN listing to be modified without updating a step number for each branch instruction. A map of labels and corresponding line numbers is created. The map is used when parsing the RPN. When a label is encountered, the parser replaces the label by its corresponding step number.

Figure 9A:
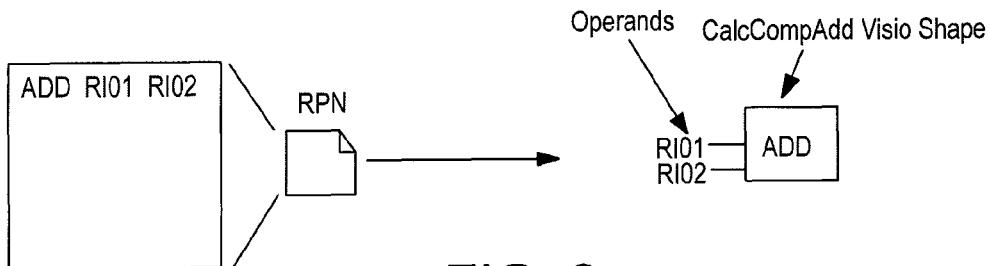
FIGS. 9a-l, comprise a set of examples illustrating steps performed during the text to graphical conversion process summarized in FIG. 8.

Next, during stage 810 the importation process parses the RPN listing and creates a CalcComp object for each instruction in the RPN listing. A simple example is provided in FIG. 9a depicting an ADD instruction and its corresponding graphical CalcComp object (i.e., CalcCompAdd). The CalcComp object is represented, for example, by a VISIO shape in the FBD editor window. After the CalcComp object is created, its RPN is passed to the Import( ) method 306. The Import( ) method 306 sets the number of connections, operands or constant, and comment in the VISIO shape. The number of tokens in the RPN instruction, and in some cases the token type, determines the instruction type identified by the parser during stage 810. If the instruction type is not equal to the original type, the parser automatically resizes the instruction shape displaying connected operand shapes and the number of connection points. In FIG. 9a, a CalcCompAdd object, derived from the base CalcComp object class, represents the ADD instruction. The depicted VISIO shape has two connected operands RI01 and RI02.

Figure 9B:
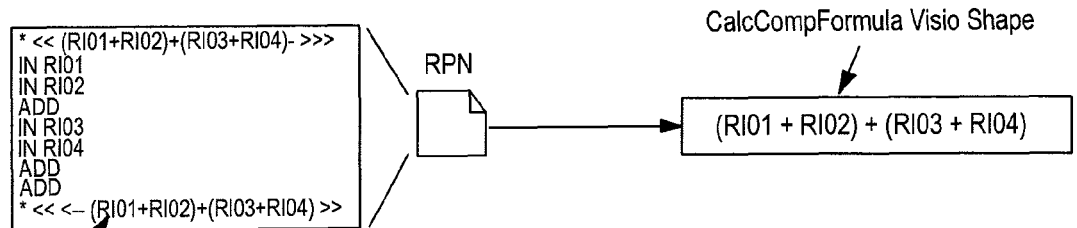

Turning briefly to FIG. 9b, an RPN line containing a formula is depicted along with a corresponding CalcCompFormula object shape. If a line of the RPN listing contains a begin tag (e.g., <<(formula text/symbol representation) >>) for a formula, the lines read up to the formula's end tag represent the formula's RPN. The RPN is compared, both optimized and non-optimized, against the RPN text generated by the formula in the begin tag. If the RPN matches, a CalcCompFormula object is created. Otherwise the formula is broken and a CalcComp object will be created for each instruction in the RPN. In FIG. 9b, a CalcCompFormula object, derived from CalcComp, represents the formula. The VISIO shape displays the formula in the diagram and stores the RPN instructions associated with the formula in an RPN cell within the CalcCompFormula object.

Figure 9C:
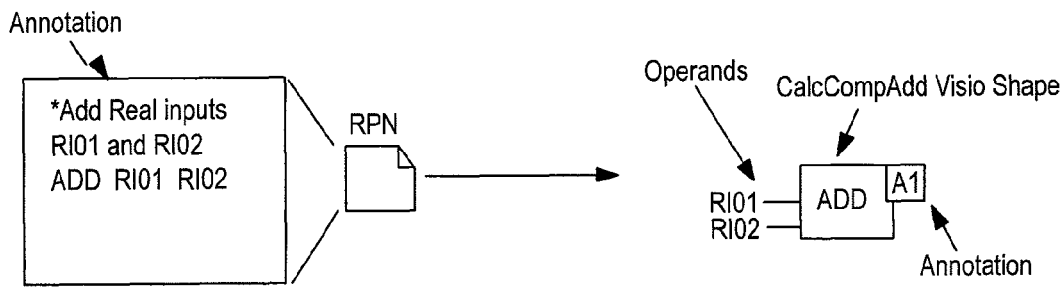

The instruction parser supports annotations. More particularly, if a line represents an annotation (indicated by a "*" character at the beginning of the line), the parser stores the annotation in a list until a next CalcComp object is created. After the next CalcComp is created any annotations in the list are stored in the VISIO shape's Annotations cell. In FIG. 9c, a VISIO shape representing the CalcCompADD object contains annotation A1.

During stage 820, split NOP instructions are processed to accommodate branches to a NOP instruction within a string of NOP instructions. A CalcCompNOP instruction class, derived from the CalcComp instruction base class, represents one or more consecutive NOP instructions (empty steps). If the parser encounters a NOP or empty step while parsing the RPN text, a CalcCompNOP object instance is created. Each consecutive NOP instruction encountered thereafter increments the value stored in the VISIO shape's number cell. The counter is implemented rather than create another CalcCompNOP object and VISIO shape on the diagram for each consecutive NOP instruction. A CalcCompNOP object is split into two separate components if either one of the following conditions is satisfied:

(1) a comment is inserted between two NOP components; or (2) another component jumps to a step number inside the range of steps represented by the component.

Figure 9D:
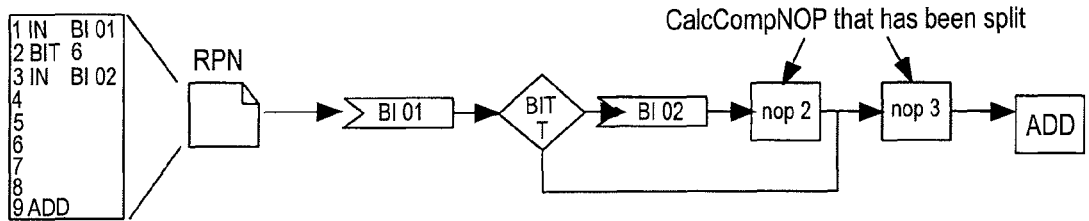

Briefly referencing FIG. 9d, the CalcCompNOP object is split into two components because the CalcComp object, representing the BIT instruction, jumps to a step within a range of steps represented by the CalcCompNOP.

During stage 830, unreferenced instructions (components) of the converted RPN listing are removed. This is an optimization procedure to eliminate unneeded clutter in the FBD. An unreferenced component is an instruction that can never be executed by the RPN logic. Such CalcComp objects in the converted RPN are removed from the FBD representation for improved readability. All instructions need to be analyzed in order to determine if a CalcComp is unreferenced. If a branch instruction is encountered (BIF, BII, BIN, BIP, BIT, BIZ, or GTO) a list of step numbers is maintained to which these CalcComp objects jump.

Figure 9E:
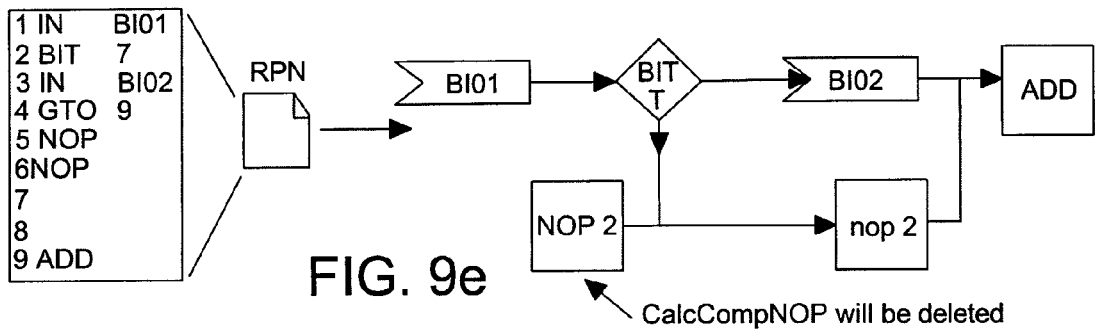

When a GTO instruction is encountered, a local flag bDelete is set to true inside the loop. If this flag is true, the step number of the next CalcComp in the loop is compared against the step numbers currently in the list. If a match is found, the bDelete flag will be reset to false. Otherwise the CalcComp is added to a list of CalcComp objects to delete. Once all CalcComp objects have been analyzed, any unreferenced CalcComp objects are deleted from the diagram. Turning briefly to FIG. 9e, the CalcCompNOP object and its VISIO Shape "NOP 2" are identified as an unreferenced component.

During stage 840 goto (GTO) instructions are removed. For readability GTO components are removed from the diagram. During stage 840, GTO instructions are removed from the parsed RPN instructions if either one of the following rules are satisfied:

(1) the GTO component jumps to a next instruction, (2) the GTO component jumps to an instruction before its step number, (3) the GTO component does not jump to a step number, (4) the GTO component jumps to itself, or (5) the GTO component jumps beyond the last instruction.

Any remaining GTO components are removed during step 870 described herein below.

During stage 850 the instruction objects are connected. Stage 850 thus determines which CalcComp objects are connected to any GTO CalcComp objects. These components will then be reconnected to another CalcComp which is discussed in further detail in the description of stage 870. During stage 860 each CalcComp object is connected to another instruction (component) through the object's Connect( ) method. Most classes derived from the CalcComp class override the base CalcComp Connect( ) method to perform their own specialized processing. The CalcComp base class has a member variable called importStackCount which is determined by how many tokens are processed by the instruction and specifies the number of CalComp objects on the import stack that can be connected to this component. If the component has a branch dependency, meaning a branch jumps to this instruction, the CalcComp objects on the stack will be connected in a chain to the first input connection. If the component does not have a branch dependency the chain of components is broken and each CalcComp is connected to an available input on the object.

The diagrams below discuss how derived CalcComp templates override the above-described Connect( ) method depending on if the instruction pushes a new value onto the stack.

Figure 9F:
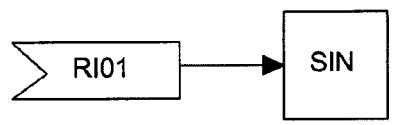

A CalcCompSIN object reads a value in its accumulator, computes a new value, writes the result directly to the accumulator, and does not push onto the stack. In this method, if the import stack count is greater or equal to one, the component on the top of the stack is connected to the input connection point of this component. In the illustrative example depicted in FIG. 9f, CalcCompIN is popped off the stack and connected to CalcCompSIN. CalcCompSIN is pushed onto the stack in order to connect to the next component in the list.

Figure 9G:
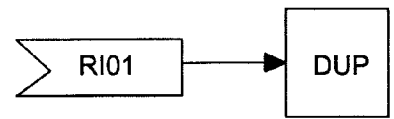

A CalcCompDUP object copies the last stack operand and pushes the value onto the stack and advancing the stack pointer one position. In this method, if the import stack count is greater or equal to one, the component on the top of the stack is connected to the input connection point of this component. If this component has a branch dependency and the import stack count is still greater than one, the stack is cleared except for the last pushed component. Next this CalcComp is pushed onto the stack. In the illustrative example depicted in FIG. 9g, a CalcCompIN instruction is popped off the stack and connected to the CalcCompDUP instruction. The CalcCompDUP instruction is pushed onto the stack in order to connect to the next component in the list.

Figure 9H:
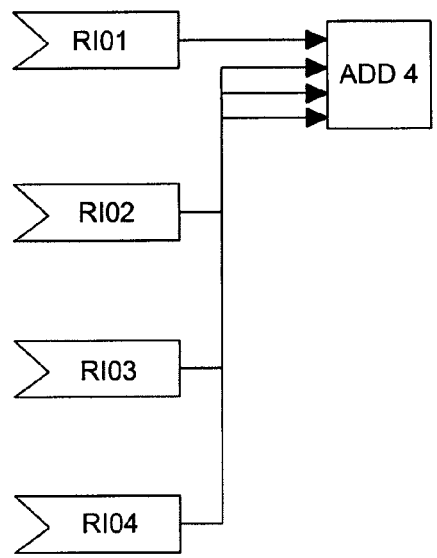
Figure 9I:
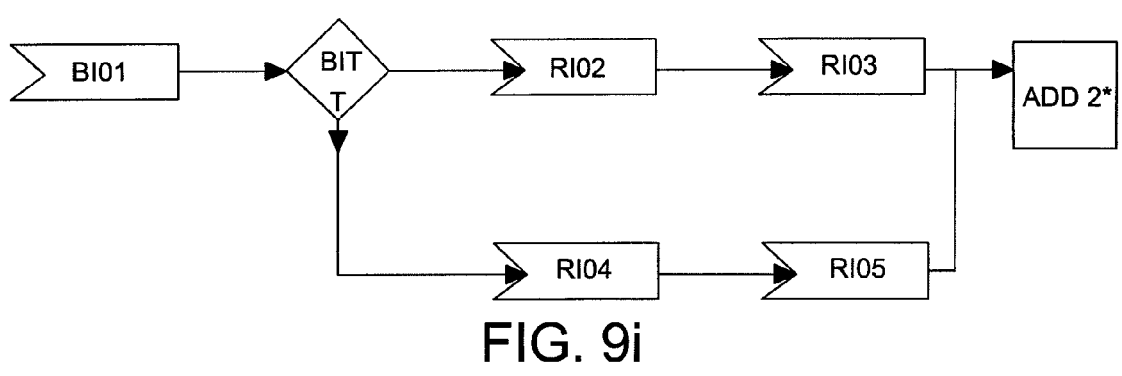

Turning to FIGS. 9h and 9i, a CalcCompADD instruction has multiple inputs, uses operands on the stack in its calculation and pushes a new value onto the stack, in turn advancing the stack pointer one position. In this method, if the import stack count is equal to zero, the previous CalcComp is connected to this component. Otherwise, each component on the stack is connected to an available input connection point on this component. If this CalcComp has a branch dependency all components on the stack will be chained to the first input connection point. Next this CalcComp is pushed onto the stack. In the illustrative example provided in FIG. 9h, all CalcComp objects are popped off the stack and connected to an available input connection point on the component. In the illustrative example provided in FIG. 9i, the CalcCompADD instruction has a branch dependency. All instructions on the stack are connected in a chain to the first input connection point on the component. If the BIT instruction is false, RI02 and RI03 are added placing the result in the accumulator. If the BIT instruction is true, RI04 and RI05 are added placing the result in the accumulator.

Figure 9J:
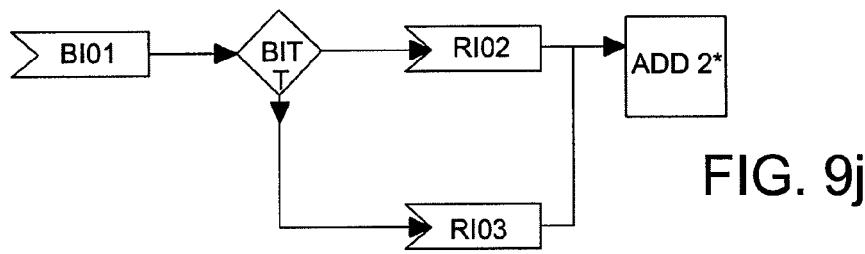

Turning to FIG. 9j, a CalcCompBIF instruction branches to a step number if the value in the accumulator is false and leaves the stack pointer unchanged. In the CalcCompBIF Connect( ) method, the previous CalcComp instruction is connected to an input connection point of this component. The branch connection point of the CalcCompBIF instruction is connected to the input connection point of the component at the specified step number. In the illustrative example set forth in FIG. 6-11, the CalcCompIN instruction is connected to the input connection point on CalcCompBIT. The branch connection point on the CalcCompBIT instruction is connected to the input connection point on the CalcCompIN instruction.

Figure 9K:
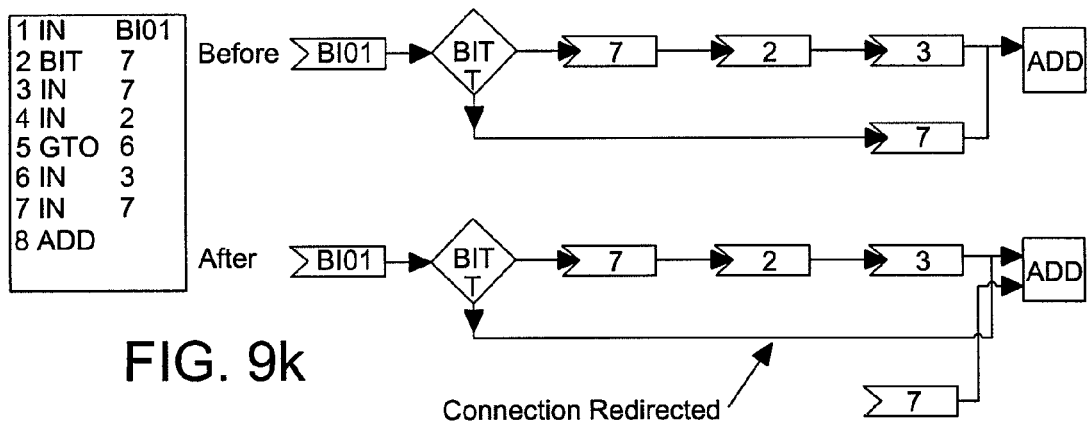

During stage 860 branch connections are adjusted. Turning to FIG. 9k, branch connections are adjusted for diagram readability, a branch connection is reconnected to another component if either one of these rules are satisfied:

(1) a GTO instruction does not exist between the branch instruction and the step to which the branch instruction is jumping;

(2) a GTO instruction does exist between the branch instruction, and the step to which the branch instruction is jumping, but the GTO instruction branches to an instruction before the instruction to which the branch instruction jumps. In FIG. 9k, the CalcCompBIT instruction's branch connection has been redirected to CalcCompADD. If the BIT instruction is false, constants 3 and 7 are added and the result is placed in the accumulator. If the BIT instruction is true, BI01 and constant 7 are added and the result is placed in the accumulator. In the "Before" diagram the connection is not redirected, making it very difficult to read which variables will be added.

Figure 9L:
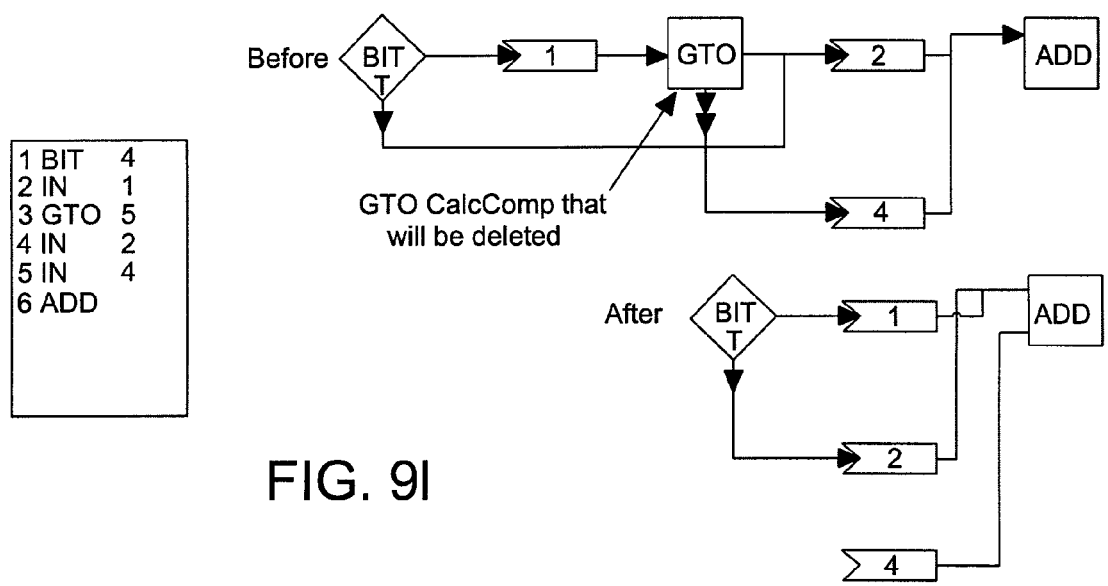

During stage 870 additional GTO instructions are removed. Now that all components are connected, any/all remaining GTO instructions are removed from the diagram. The connections are traversed for each GTO instructions to determine which components are connected to the GTO instructions. The instructions connected to the GTO instruction are reconnected to another instruction object in the diagram. Referring to FIG. 9l, the "Before" diagram contains a GTO instruction. In the "After" diagram the GTO instruction has been deleted and instructions that were connected to the GTO instruction are now reconnected to other instructions.

The RPN listing in FIG. 9l from which the "Before" and "After" diagrams were created will used to explain the steps involved in this process.

1. First a list is generated containing all GTO CalcComps in the diagram.

2. For each GTO instruction in the RPN listing, find the instruction before the instruction that is specified in the GTO branch. In the diagram below, "IN 2" is the instruction before the GTO branch.

3. Traverse the output connection of the instruction and get the instruction that is connected to the sink endpoint. In the "Before" diagram, the "ADD" instruction is the sink instruction and "IN 2" is the source instruction.

4. Traverse the GTO branch connection and get the instruction connected to the sink endpoint. In the "Before" diagram, "IN 4" is the instruction at the sink endpoint of the connection.

5. In the RPN listing, locate a first branch instruction that branches to an instruction after the GTO's step number. In the diagram in FIG. 9l, "BIT 4" is the first branch that branches to an instruction after the step number of the GTO instruction.

6. The connection connected to the input connection point on the GTO instruction is reconnected to the "ADD" instruction from Step 3. The connection point connected to the branch connection point from the BIT instruction will remain connected to the "IN 2" instruction. In this case the connection remained the same, but this might not always be true. The connection from "IN 4" is now connected to the second connection point on the ADD instruction. See, "After" diagram in FIG. 9l.

During stage 875 the importation process lays out the diagram's connected components according to a set of steps described herein below with reference to FIG. 10.

During stage 880 the importation process adjusts connections to graphical shapes on the FBD. In an exemplary embodiment, the importation process disconnects input connections to each instruction and then reconnects the input connections to the next available input connection point. This will eliminate empty connection points on the VISIO shape if any exist.

During stage 885 the importation process sets the text displayed on the graphical shapes associated with the instructions. In particular, for each CalcComp object, the importation process retrieves a cell value stored in a SetInstructionText attribute. If the value is set to 1, then the CalcComp object's instruction is calculated and stored in the shape's cell InstructionText attribute. This text from the InstructionText attribute is displayed on the graphical shape for the instruction.

During stage 890 all warning and error messages generated during any of the above importation steps are reported to the output window 506 to inform the user of any issues encountered by the importation process during the importation procedure.

FIG. 10 summarizes a set of steps associated with an exemplary method for laying out the instructions of the graphical FBD generated by the aforementioned importation process. In an exemplary embodiment the layout process is carried out by a set of methods.

A Layout( ) method is the main method that handles the layout of FBD instruction shapes. The shapes are positioned, by way of example, in a horizontal layout from left to right when creating the graphical FBD representation of a corresponding RPN instruction list. Both horizontal and vertical spacing between shapes is customizable via, for example, an options dialog. A suitable default spacing value is 0.5 inch.

The Layout( ) method iterates through all instructions and invokes a FindRelatedShapes( ) method (described below). If an instruction does not have an output connection, the instruction is added to a list that is sorted by an OrderComponentsWithNoOutputs( ) method (described below). A first component in the list is now the starting point for placing the components on the diagram.

The OrderComponentsWithNoOutputs method locates all components on the FBD that do not have any output connections. The OrderComponentsWithNoOutputs method traverses the internal model of the CalcComp objects and finds the top most input instruction for each instruction object with no output connections. The instruction objects will then be placed in the order of their top most input component Y coordinate.

The following is a set of methods implemented on the CalcComp base class to facilitate the diagram layout process with regard to individual instructions.

The FindRelatedShapes( ) method iterates through all connections to the component. If the connection is connected to a cell named Connections.Inx, Connections.Outx, or Connections.Branch, the component on the other end of the connection is placed in the appropriate list.

A Layout( ) method handles the layout of the instruction. The instruction is positioned at the specified X and Y coordinates. Input connections to the instruction are considered to be branches, the size of each branch is calculated by traversing the input connection and adding the size of each instruction. The horizontal offset and branch size will determine the starting point. The first instruction in the branch will be placed at that position. The remaining instructions in the branch are positioned by recursively invoking the Layout( ) method of each instruction.

Output connections from the instruction are sorted based on the order in which the instruction appears in the RPN. This will determine the order in which output instructions are positioned. The Layout( ) method is invoked for each instruction in the diagram.

For branch connections from the instruction, the Layout( ) method first checks to see if a true branch will eventually merge with a false branch. If the branch does merge there is no work to be done. Such instructions will eventually be positioned on the false branch that merges with this branch. If the branch does not merge the instruction is connected to the branch connection. The size of the branch is calculated by traversing the input connection and output connection and adding the size of each instruction. The vertical offset and branch size determines the starting point. The first instruction in a branch is placed at that position, and then the remaining instructions in the branch are positioned by recursively invoking the Layout( ) method of each instruction.

An OrderComponents( ) method receives an order of instructions based upon where the instruction appears in the RPN.

A GetFirstComp( ) method recursively traverses the input instructions connected to this instruction and returns the first instruction in a branch.

A SetLocation( ) method is overridden by several classes derived from CalcComp. The base method sets the position of the instruction and instances where the method is overridden takes into account any operand instructions.

An AlignComponent( ) method, for instructions that have one input connection point and one input connection, horizontally aligns the instruction with the output connection point of the source instruction.

A BoundingRectangle( ) method is overridden by several classes derived from CalcComp. The base class version of this method calculates the bounding rectangle of the instruction and, in cases where the method is overridden, takes into account any operand instructions.

A BoundingRectThroughInputs( ) method traverses the input instructions in a branch and calculates the bounding rectangle based on the size of the instructions.

A BoundingRectThroughOutputs( ) method traverses the output instructions in the branch and calculates the bounding rectangle based on the size of the instructions.

A CalcBoundingRectangleForRangeToLeft( ) method takes a left point and right point and calculates the size of all instructions to the left of this instruction that are in between the left and right point range.

A CalcBoundingRectangleForRangeToRight( ) method takes a left point and right point and calculates the size of all instructions to the right of this instruction that are in between the left and right point range.

A DoesBranchMerge( ) method Returns true if the false branch merges with the true branch and otherwise returns false.

A GetComponentsToTheRight( ) method retrieves all instructions to the right of the specified instruction.

Each CalcComp object also includes a set of data fields that are utilized to define the position of the instruction shape on the diagram as well as its connectivity to other instruction shapes. An inputs field a list of instructions connected to input connection points. The instructions in the list are ordered based on the connection point. An outputs field contains a list of instructions connected to the output connection point. A branches field contains a list of instruction shapes connected to the branch connection point. A positioned field contains a Boolean value indicating whether the shape is positioned. A HorizontalOffset field contains a horizontal offset for spacing instruction shapes. A VerticalOffset field contains a vertical offset for spacing instruction shapes.

Having described a set of methods and data supporting automatic generation of FBD diagram layouts, attention is directed to the set of stages identified in FIG. 10. During stage 1000 the main Layout method (for the diagram) builds an array of output instructions by finding instructions that do not have any output connections.

Next, at step 1010 the list of instructions is ordered. In an exemplary embodiment the instructions are ordered by traversing the CalcComp objects and locating the top most input instruction connected to each instruction in the list of CalcComp objects. The instructions are ordered based on the Y coordinate of the top most input instruction. In the example provided in FIG. 11a, the order of output instructions is ADD 2, RO01, and RO02.

Figure 11A:
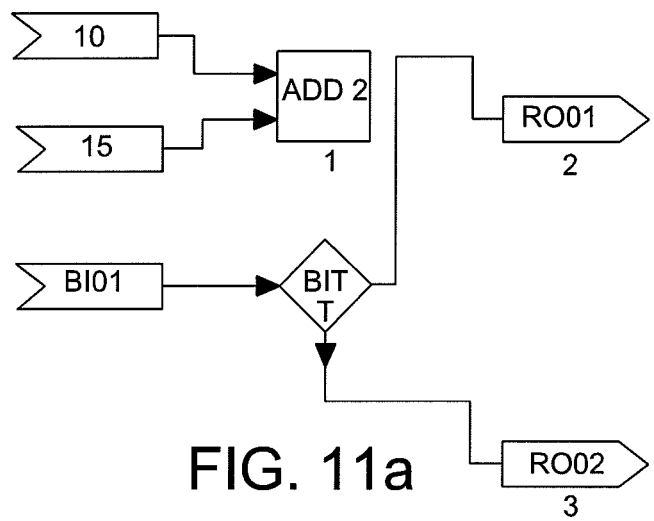
FIGS. 11a-e, comprise a set of examples illustrating steps performed during the layout process summarized in FIG. 10.
Figure 11B:
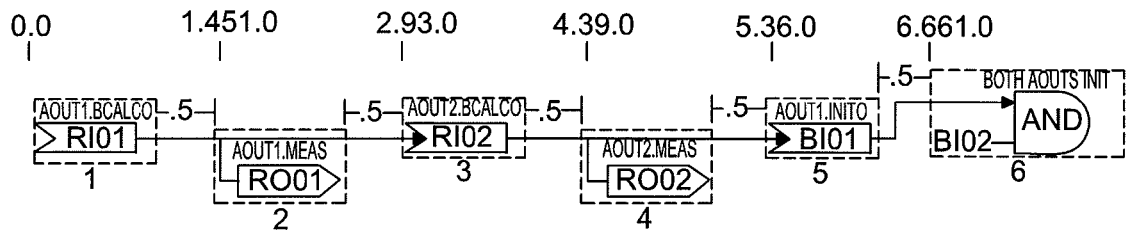

Thereafter, during stage 1020 the ordered instructions are placed on the diagram according to a set of lay out rules described herein below. In the following, a set of layout examples are provided to demonstrate rules applied to instructions to position their shapes when laying out the diagram. FIG. 11b depicts laying out instructions in a horizontal chain. The instructions are positioned in a horizontal chain. The AND instruction, having no output connection, is traversed through its input connection to retrieve the first instruction in the list "IN RI01". The IN RI01 instruction is positioned at location 0,0. This will be the starting point for positioning the instructions in the chain. The instruction width and horizontal offset are used by the layout process to determine the position of the next instruction. Traversing the output connection point of each instruction and applying the horizontal offset will position the remaining instructions on the diagram.

Figure 11C:
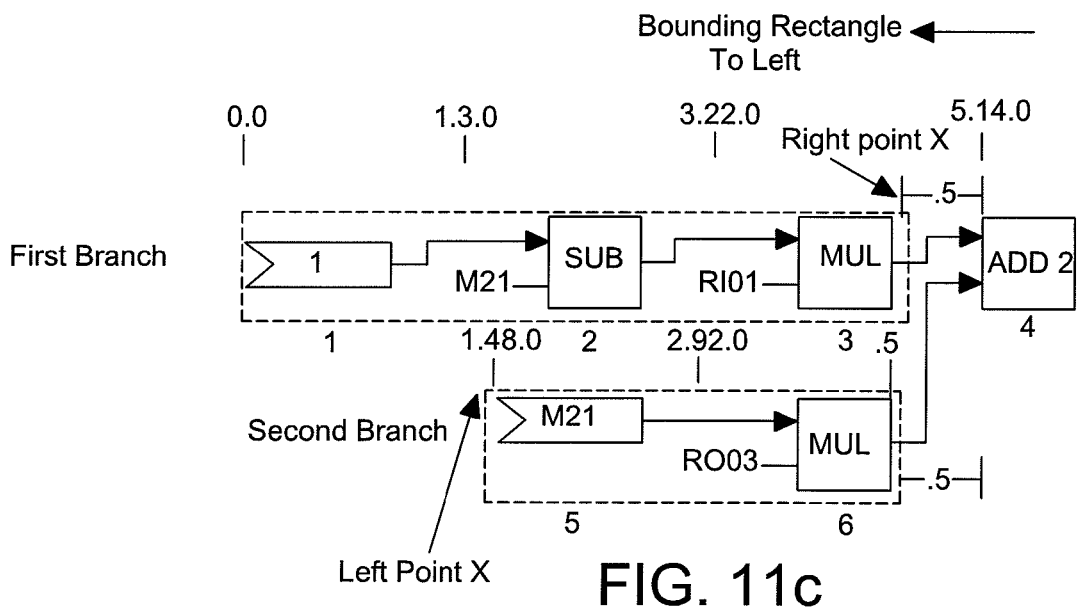

FIG. 11c, demonstrates handling of instructions having multiple inputs. In particular, FIG. 11b, demonstrates the layout of a second branch to "ADD 2". First the size of the second branch is calculated including a horizontal offset between each instruction. Next, the right and left point X is calculated. The right point X is retrieved from the last instruction in the first branch "MUL RI01". The left point X is calculated using the horizontal offset from "ADD 2" and the width of the second branch. These points are used to calculate the height of the instructions in the first branch that are between the right and left points. The width of the second branch, the height of the first branch, and vertical offset are used to calculate the starting point for positioning the instructions in the second branch. The width of the first instruction and horizontal offset indicate the position of the next instruction. Traversing the output connection point of each instruction and applying the horizontal offset requirements will position the remaining instructions in the branch.

Figure 11D:
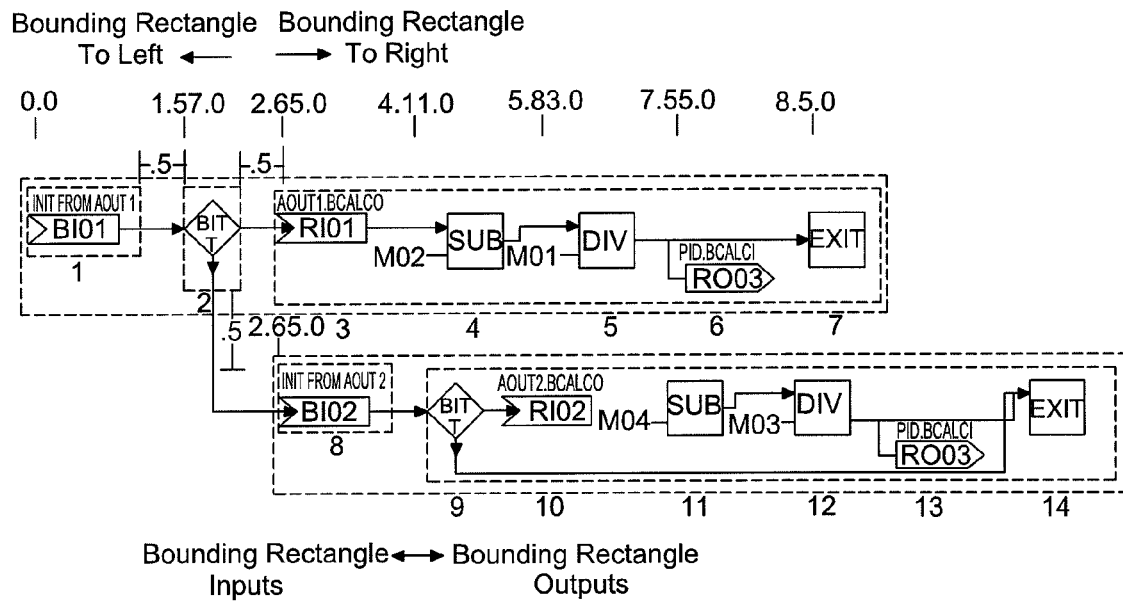

FIG. 11d demonstrates handling branch instructions. In particular, FIG. 11d demonstrates positioning of a branch connected to a first BIT instruction. First a true branch is traversed to check if the branch merges with a false branch. In this case the branch does not merge. The width of the branch is calculated by traversing both the input and output connections to and from the IN BIO2 instruction. The BIT instruction in the first branch is traversed to the left to find the lowest point and then to the right to find the lowest point. The vertical offset and lowest point are used to specify the starting Y coordinate for positioning the instructions in the branch. The first instruction, IN BIO2, is placed at the new X and Y coordinate. The remaining instructions in the branch are positioned by recursively invoking the above-described Layout( ) method of each instruction.

Figure 11E:
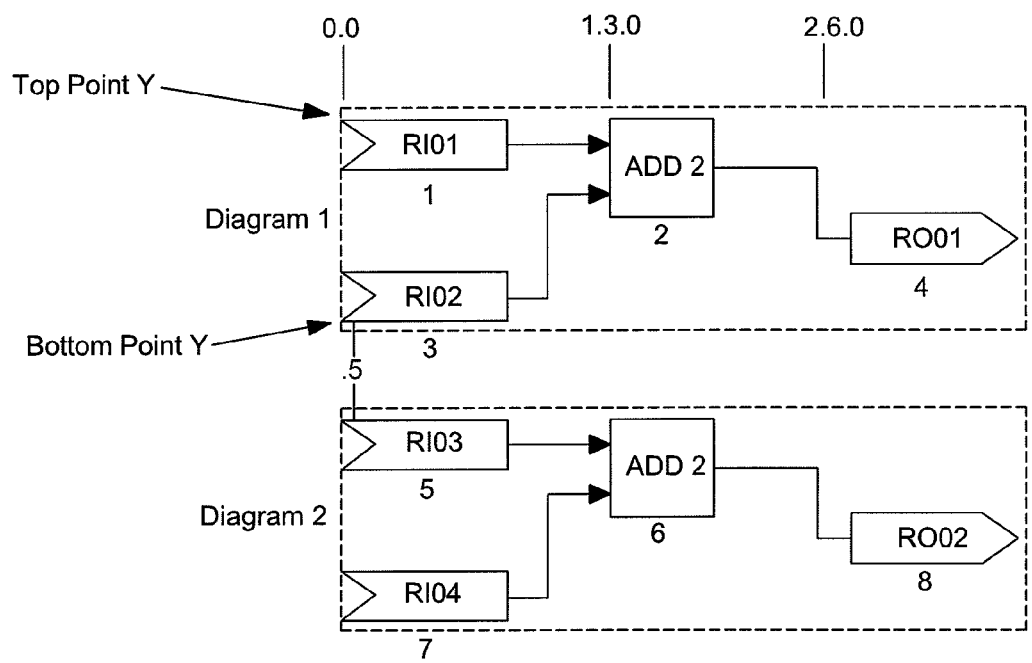

FIG. 11e demonstrates handling two unconnected diagrams (i.e., having no shared connections. In particular, FIG. 11e demonstrates the layout of a diagram having disconnected parts. In RPN a disconnected diagram is specified by, for example, a "*==" character sequence. The first diagram is positioned from left to right keeping track of the lowest Y coordinate of any instruction. The bottom Y coordinate of the first diagram and vertical offset are the starting point for positioning instructions in the second diagram.

Converting FBD graphics to RPN text is now described herein. Such conversion is used in a variety of circumstances in the exemplary embodiment including when a user:

1. makes any change to the graphic, including adding/deleting instruction/connection, moving shape, configuring instruction. The RPN is used to populate the RPN in the confirmation panel 504.

2. saves a LOGIC BLOCK object. The RPN is validated and is saved into the block.

3. presses the Validate button. The Editor validates generated RPN.

4. switches to the RPN text editor mode. The generated RPN instruction listing is passed to the text editor.

5. switches from the text editor to graphical editor. The RPN is used in the logic that defines whether to rebuild the graphical FBD.

6. opens a LOGIC BLOCK with the graphical editor as the active editor. The RPN is used by the logic that decides whether to rebuild the graphical FBD display.

The information built when RPN is generated is slightly different for those cases. In cases 1, 2, and 6 the editor 202 builds RPN without annotations and labels. In cases 2, 4, and 5 the editor builds RPN with annotations and labels. In cases 2 and 3 the editor builds RPN with annotations, labels, and with additional information needed by validation logic to associate step in RPN code with instruction shapes in Graphical Editor.

When a block is saved (case 2) the editor 202 builds three RPN representations of the graphic: first it builds the RPN with annotations, labels, and additional validation information for validation; second it builds the RPN with just annotations and labels to be saved as the editor 202's RPN, and finally it builds RPN without annotations and labels to be saved into block's STEP attributes.

In an exemplary embodiment, three different methods are implemented that rely upon graphics-to-text conversion. A GenerateInstructions( ) method is used to generate instructions for the RPN confirmation panel 504 in the graphical editor mode window. The GenerateInstructions( ) method generates RPN without annotations and labels. A GetRPNCode( ) method has two arguments that specify if annotations or labels shall be generated. A TMPRPNCode( ) method builds RPN with additional validation information used to match steps to instruction shapes.

Each of the methods builds each instruction in RPN code in the format:
  instruction_id, instruction_name\tadditional_info
  where:
  instruction_id—index that uniquely identifies the instruction. The instruction_id is generated when CalcComp is created.
  instruction_, name—name of the instruction like "SUB", "MAX", etc.
For example:
  Instruction SUB can have following RPN code: 12,SUB
  Instruction ADD 4 can have following RPN code: 15,ADD\t4
  Instruction ADD RI01 RI02 can have following RPN code: 23,ADD\tRI01 RI02

All three methods employ similar logic of generating RPN which is described herein below. The editor 202 maintains an internal object model. In that model each instruction is represented by an instruction object class derived from CalcComp. The component class contains information and methods needed to parse the graphic definition of the instruction and build corresponding RPN code.

The following is a description of the primary methods from the CalcComp base class used to generate RPN text from a LOGIC BLOCK object's graphical FBD definition.

A FindRelatedShapes( ) method initializes an instruction's data members that are used in RPN generation. The method iterates through all connections of the instruction. If a cell is found through which the connection connects to the instruction, then the cell defines the cell as an input, output, or branch connection. Next the method finds an instruction on the other end of the connection to the cell and adds it to the appropriate list of connected instructions. The method arranges all input instructions in proper order. This is done by a BuildSortedInputsCompList( ) method that order's an instruction's input instructions. The method also resets a traverse flag, thus preparing the instruction for RPN generation.

An OrderComponentsWithNoOutputs( ) method orders the diagram output instructions (leaves). The method finds, for each diagram leaf, a list of diagram input instructions (roots) to which it connects through its inputs. The method traverses the LOGIC BLOCK object's internal model until it finds all diagram roots connected to this instruction (including connected through other instructions). The traverse logic recursively goes through this instruction's input instruction, then through input instruction's input instructions, and so on, until it finds all diagram roots to which this instruction connects. Next the method finds the diagram root in the list that has the highest Y coordinate. Then the method orders the diagram leaves in the order of diagram root's Y coordinate. The leaf that has a root with the highest Y coordinate is placed first. If several leaves have a same root, the leaf instructions are ordered based on the leaf's Y coordinate. The leaf that has the greatest Y coordinate is placed first.

A CumulativeInstructions( ) method builds a cumulativeInstructions array.

A CalcMyInstruction( ) method generates the instruction's RPN code used in RPN generation.

A BuildCommandForInsteredGTOInstruction( ) method builds RPN code for an inserted GTO instruction. The method first finds a branching instruction to which the GTO instruction belongs. The editor 202 will need the branching instruction to retrieve the annotations for GTO and labels (if used). The method builds an array of source branching instructions for the last instruction in the "True" branch by calling a GetSourceBranches( ) method (described below). Then it builds an array of source branching instructions for a last instruction in the "False" branch by calling the same GetSourceBranches( ) method. Next it analyzes arrays to find a branching instruction that is in both arrays. That is the branching instruction to which the GTO belongs. Next, the method finds the instruction to which the GTO shall jump. If the True branch is connected to the last connected input of the instruction the branching converge into, then GTO jumps to the converge instruction. If the converged instruction has a next input connected, then GTO jumps to the first instruction of the instruction chain connected to the next input. The GetFirstComp( ) method (described below) is called to find the first instruction in the chain.

A GetSourceBranches( ) method recursively iterates through instructions inputs and adds all branching instructions to the array.

A GetFirstComp( ) method gets a first root instruction. The method iterates through a first connected input.

A RemoveUnneededGTOPRGEND( ) method analyzes RPN code and finds GTO Program End instructions. It removes a GTO instruction from the RPN code if either the GTO instruction is the last instruction or the previous instruction is the last instruction in the independent diagram. In the second case the GTO instruction is not needed because control will go to the next independent diagram anyway.

A GetLabels( ) method retrieves guid and label information from GTO and branching instructions in RPN code. The method builds information about labels usage, including:
    array of branch label info strings for each GTO and Branching instructions that uses label. The string contains:
      guid of the instruction shape;
      label
      target instruction_id
    map of target instruction_ids to labels;
    map of instruction_id to label For each GTO or branching instruction it the method calls ExtractBranchLabel method that does actual work.

An ExtractBranchLabel( ) method removes guid and label information from GTO and Branching instructions. The method builds information about labels usage, including:
    array of branch label info strings for each GTO and Branching instructions that uses label. The string contains:
      guid of the instruction shape;
      label
      target instruction_id
    map of target instruction_ids to labels;
    map of instruction_id to label Next, a set of data fields within instruction objects are described that relate to RPN generation.

inputs List of input components (Components connected to the Inputs of this component). This list excludes Branching components that are connected to this component through the Branch output (they are in inputsFromBxx list).

The components in the list are in the specific order: first component in the list shall be component connected to the In1 input connect point. Next component in the list shall be component connected to In2 input connect point, etc. If any of the input connect points has a fan-in connection from the same Branching component, then the first shall be component coming out of False branch of the Branching component, and then component coming from the True branch.

An outputs field stores a list of output instructions—i.e., instructions connected to the output of this instruction.

A branches field stores a list of branch components—i.e., instructions connected to the branch output of this instruction.

An inputsFromBxx field stores a list of branching instructions connected to Inputs of this instruction through the branch outputs.

A branchInputs field stores a list of input instructions that that come from the True branch of the branching instruction. For example, if this instruction is a converge point of a branching instruction, then the instruction in the True branch that is connected to this instruction is in the list.

A traversed flag stores a value indicating that this instruction has been traverse by RPN generation logic.

A cumulativeInstructions field stores an instruction's cumulative RPN code. It represents this instruction code and recursively input instruction code.

The steps executed by a GenerateInstructions( ) method of the editor 202 to generate RPN code from a graphical FBD definition are explained herein with reference to FIG. 12. During step 1200 the output instructions are identified. More particularly, the editor 202 builds an array of FBD output instructions (noOutComponents) and diagram branching instructions (branchComponents). A diagram output instruction (diagram leaf) is an instruction that doesn't have instructions connected to its outputs. A diagram branching instruction is an instruction that represents branching instructions. In the exemplary embodiment the editor 202 calls the FindRelatedShapes( ) method on each instruction (see above) while building the array of diagram leaves.

Figure 13A:
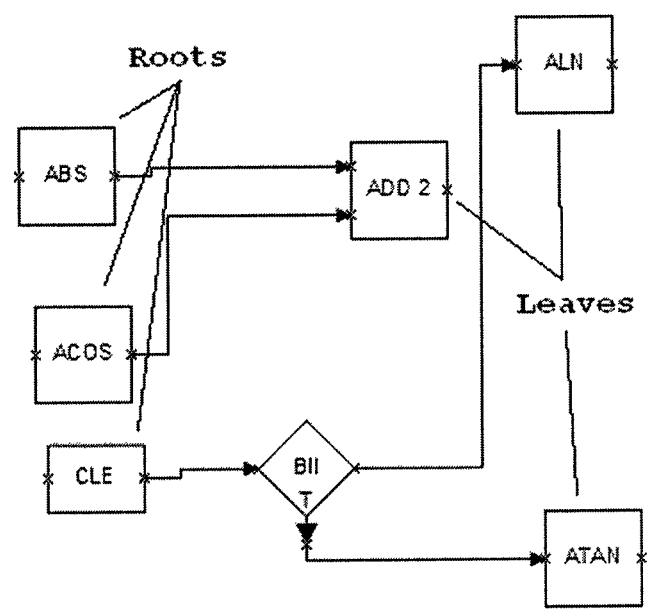
FIGS. 13a-c, comprise a set of examples illustrating steps performed during the conversion process summarized in FIG. 12.

Next, during step 1210 the editor 202 orders the diagram output instructions (leaves) by calling the OrderComponentsWithNoOutPuts( ) method described herein above. As an example in FIG. 13a the order of diagram output instructions is:
    ADD 2; ALN; ATAN The editor 202 generates RPN code in the order of the diagram leaves established during step 1210.

In the steps that follow, the editor 202 iterates through a list of diagram leaf instructions, and for each leaf it calls the CumulativeInstructions( ) method. The CumulativeInstructions( ) method recursively traverses an instruction's inputs and generates RPN code for those instructions. The generated RPN code is added to a collection of RPN text. The editor 202 also builds an array of last instructions of independent diagrams (lastComponents array). The list doesn't contain the last instruction of the last independent diagram. If there is no independent diagram, then list is empty. The list is used when the editor 202 adds a GTO instruction to program End instructions.

During step 1220, the process of building actual RPN text instructions commences by calling the CumulativeInstructions( ) method which thereafter:

Clears a cumulativeInstructions array;

Calls the CalcMyComponent( ) method that builds this instruction's RPN code; and Processes each instruction in the input array as follows:
1. If an input instruction is not traversed, then:
   If input instruction is in a branchInputs array, then the appropriate GTO instruction is added to the cumulativeInstructions array.

Figures 13B, 13C:
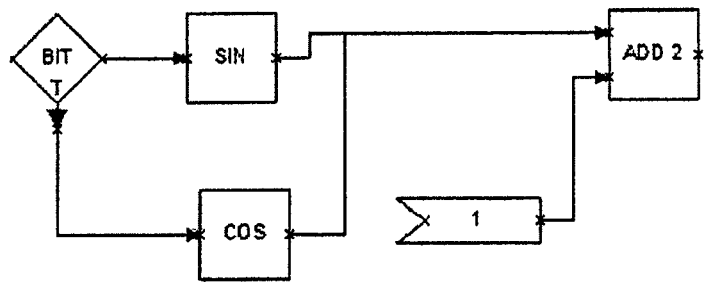

This logic is responsible for inserting GTO at the end of the False branch of Branching instruction. The GTO instruction is generated by BuildCommandForInsteredGTOInstruction method. FIG. 13b, is an example of a GTO instruction being inserted by this logic.

2. Else if an input instruction has fan out, this instruction RPN code is added to the cumulativeInstructions. This logic is responsible for inserting additional instances of a same instruction in the case of fan out.

Processes each instruction in an inputFromBxx array. If inputFromBxx instruction is not traversed, then the method finds a last instruction in the False branch, executes the CumulativeInstructions( ) method for the last instruction, and adds the last instruction's resulting "cumulativeInstructions" to this instruction's cumulativeInstructions. The last instruction in the False branch is found by GetLastCompThroughFalseBranch method.

Adds this instruction's RPN code to the cumulativeInstructions.

If instruction has no connected outputs, but supports outputs, the RPN code for GTO to the Program End instruction is added to the instruction's cumulativeInstructions. The GTO will be removed later if not needed.

In the diagram in FIG. 13b the instructions contain RPN code in their cumulativeInstructions as shown in FIG. 13c.

With continued reference to FIG. 12, during step 1230 un-needed GTO instructions to the program End are removed. This logic is implemented by the RemoveUnneededGTOPRGEND( ) method described previously herein above.

Thereafter, at step 1240 the editor 202 resolves branching and GTO instructions. At this point Branching and GTO instructions reference target instructions by their unique instruction_id. the editor 202 resolves instruction_ids to an actual step number. The editor 202 also resolves GTO to the program End to an actual step number—which is either:
1. the first step of the next independent diagram; or
2. if there is no next independent diagram, then it's the first unused step; or
3. if all steps are used—a non-existing step.

To carry out the resolving step 1240, the editor 202:

Calls a GetMapLastCompIDToStepNumber( ) method to build a map of instruction_id of last instructions (from lastComponents array) of independent diagrams to step numbers.

Calls a GetLabels( ) method to remove unneeded information (e.g., line, guid, and label info) from GTO and branching instructions' RPN code.

Calls a FixupBranchingInstruction( ) method for each branching and GTO instruction. The method replaces a target instruction_id with a target instruction's actual step number.

Upon completion of step 1240 the RPN text is ready for use by the editor and various decision processes described herein.

The structures, techniques, and benefits discussed above are merely exemplary embodiments of the invention carried out by software executed on computing machines, such as workstations configured to support both graphical and text editing modes, and stored on tangible computer-readable media in the form of computer executable instructions. The software comprising computer-executable instructions embodying the disclosed embodiment are alternatively passed via electronic data transmission media in intangible form (i.e., as a varying electrical field) to computing devices that thereafter execute the software thereafter stored on physical computer readable media. In view of the many possible embodiments to which the principles of this invention may be applied, it should be recognized that the embodiments described herein with respect to the drawing figures are meant to be illustrative only and should not be taken as limiting the scope of invention. The illustrated embodiments can be modified in arrangement and detail without departing from the spirit of the invention. Moreover, those of skill in the art will recognize that the disclosed principles are not limited to any particular local area network protocols and/or topologies. Therefore, the invention as described herein contemplates all such embodiments as may come within the scope of the following claims and equivalents thereof.

What is claimed is:

1. A non-transitory computer readable medium including computer executable instructions for providing a multi-mode editor that facilitates editing a LOGIC BLOCK object for use in a process control system, the computer executable instructions facilitating carrying out the steps of:

providing, by the editor, a first LOGIC BLOCK editing mode wherein LOGIC BLOCK logic is represented by a graphical definition comprising instruction shapes and connections between the instruction shapes, wherein said definition further comprises object attributes for process control;

providing, by the editor, a second LOGIC BLOCK editing mode wherein LOGIC BLOCK logic is represented by a text definition comprising lines of text instructions, wherein said definition further comprises object attributes for process control;

switching, while a LOGIC BLOCK object is open in the editor, between the first and second LOGIC BLOCK editing modes, the switching comprising the sub-steps of:

storing a first graphical representation and a first text representation of the LOGIC BLOCK logic;

if the switching is from the second logic block editing mode to the first logic block editing mode:

converting the first graphical representation to a second text representation of the LOGIC BLOCK logic;

comparing the second text representation attributes with the first text representation attributes to confirm attributes did not change during said converting step;

if attributes did not change during said converting step, using the first graphical representation to generate an initial view in the first logic block editing mode;
if attributes changed during said converting step, generating a new graphical representation from the first text representation for storing in the first graphical representation;
converting the new graphical representation to a new text representation;
comparing attributes of the new text representation with the first text representation attributes;
if a difference is detected, update the first text representation with the new text representation;
if no difference is detected generating an initial view with the new graphical representation,
if the switching is from the first logic block editing mode to the second logic block editing mode:
converting the first graphical representation to a third text representation;
using the third text representation in the second logic block editing mode.

2. The non-transitory computer readable medium of claim 1 wherein the text representation comprises Reverse Polish Notation (RPN) instructions.

3. The non-transitory computer readable medium of claim 1 wherein the switching step, when performed to render the graphical representation of the LOGIC BLOCK logic, comprises executing computer-executable instructions to layout the instruction shapes according to a set of pre-defined layout rules.

4. A method for providing a multi-mode editor, via a computing system including a graphical display that facilitates editing a LOGIC BLOCK object for use in a process control system, the method comprising the steps of:
providing, by the editor, a first LOGIC BLOCK editing mode wherein LOGIC BLOCK logic is represented by a graphical definition comprising instruction shapes and connections between the instruction shapes, wherein said definition further comprises object attributes for process control;
providing, by the editor, a second LOGIC BLOCK editing mode wherein LOGIC BLOCK logic is represented by a text definition comprising lines of text instructions, wherein said definition further comprises object attributes for process control;
switching, while a LOGIC BLOCK object is open in the editor, between the first and second LOGIC BLOCK editing modes, the switching comprising the sub-steps of:
storing a first graphical representation and a first text representation of the LOGIC BLOCK logic;
if the switching is from the second logic block editing mode to the first logic block editing mode:
converting the first graphical representation to a second text representation of the LOGIC BLOCK logic;
comparing the second text representation attributes with the first text representation attributes to confirm attributes did not change during said converting step;
if attributes did not change during said converting step, using the first graphical representation to generate an initial view in the first logic block editing mode;
if attributes changed during said converting step, generating a new graphical representation from the first text representation for storing in the first graphical representation;
converting the new graphical representation to a new text representation;
comparing attributes of the new text representation with the first text representation attributes;
if a difference is detected, update the first text representation with the new text representation;
if no difference is detected generating an initial view with the new graphical representation,
if the switching is from the first logic block editing mode to the second logic block editing mode:
converting the first graphical representation to a third text representation;
using the third text representation in the second logic block editing mode.

5. The method of claim 4 wherein the text representation comprises Reverse Polish Notation (RPN) instructions.

6. The method of claim 4 wherein the switching step, when performed to render the graphical representation of the LOGIC BLOCK logic, comprises executing computer-executable instructions to layout the instruction shapes according to a set of pre-defined layout rules.

7. A workstation including thereon a physical computer readable medium including computer executable instructions for providing a multi-mode editor that facilitates editing a LOGIC BLOCK object for use in a process control system, the computer executable instructions facilitating carrying out the steps of:
providing, by the editor, a first LOGIC BLOCK editing mode wherein LOGIC BLOCK logic is represented by a graphical definition comprising instruction shapes and connections between the instruction shapes, wherein said definition further comprises object attributes for process control;
providing, by the editor, a second LOGIC BLOCK editing mode wherein LOGIC BLOCK logic is represented by a text definition comprising lines of text instructions, wherein said definition further comprises object attributes for process control;
switching, while a LOGIC BLOCK object is open in the editor, between the first and second LOGIC BLOCK editing modes, the switching comprising the sub-steps of:
storing a first graphical representation and a first text representation of the LOGIC BLOCK logic;
if the switching is from the second logic block editing mode to the first logic block editing mode:
converting the first graphical representation to a second text representation of the LOGIC BLOCK logic;
comparing the second text representation attributes with the first text representation attributes to confirm attributes did not change during said converting step;
if attributes did not change during said converting step, using the first graphical representation to generate an initial view in the first logic block editing mode;
if attributes changed during said converting step, generating a new graphical representation from the first text representation for storing in the first graphical representation;
converting the new graphical representation to a new text representation;
comparing attributes of the new text representation with the first text representation attributes;
if a difference is detected, update the first text representation with the new text representation;
if no difference is detected generating an initial view with the new graphical representation,
if the switching is from the first logic block editing mode to the second logic block editing mode:

converting the first graphical representation to a third text representation;

using the third text representation in the second logic block editing mode.

8. The workstation of claim 7 wherein the text representation comprises Reverse Polish Notation (RPN) instructions.

9. The workstation of claim 7 wherein the switching step, when performed to render the graphical representation of the LOGIC BLOCK logic, comprises executing computer-executable instructions to layout the instruction shapes according to a set of pre-defined layout rules.

10. The non-transitory computer readable medium of claim 1, wherein the switching step includes a validation step verifies text instructions edited with the LOGIC BLOCK is a valid control logic syntax.

11. The method of claim 4 wherein the switching step includes a validation step verifies text instructions edited with the LOGIC BLOCK is a valid control logic syntax.

12. The workstation of claim 7 wherein the switching step includes a validation step verifies text instructions edited with the LOGIC BLOCK is a valid control logic syntax.

\* \* \* \* \*